(12) United States Patent
Kosaka

(10) Patent No.: US 12,540,856 B2
(45) Date of Patent: Feb. 3, 2026

(54) BOLOMETER USING CARBON NANOTUBES

(71) Applicant: NEC Corporation, Tokyo (JP)

(72) Inventor: Mayumi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 269 days.

(21) Appl. No.: 18/237,002

(22) Filed: Aug. 23, 2023

(65) Prior Publication Data

US 2024/0011841 A1   Jan. 11, 2024

(30) Foreign Application Priority Data

Aug. 29, 2022 (JP) .................................. 2022-135902
May 16, 2023 (JP) .................................. 2023-080876

(51) Int. Cl.
*H10N 15/00* (2023.01)
*G01J 5/20* (2006.01)
*H10N 15/10* (2023.01)

(52) U.S. Cl.
CPC ................ *G01J 5/20* (2013.01); *H10N 15/15* (2023.02); *G01J 2005/202* (2013.01)

(58) Field of Classification Search
CPC ...... G01J 5/20; G01J 2005/202; H10N 15/15; H10N 15/00
See application file for complete search history.

(56) References Cited

U.S. PATENT DOCUMENTS

| | | | | |
|---|---|---|---|---|
| 2020/0271526 A1* | 8/2020 | Tepegoz | ................ | G01J 5/0806 |
| 2022/0034720 A1* | 2/2022 | Tanaka | ................ | G01J 5/0853 |
| 2022/0364928 A1* | 11/2022 | Kosaka | ................ | G01J 5/0205 |

FOREIGN PATENT DOCUMENTS

| | | |
|---|---|---|
| JP | 2015-049207 A | 3/2015 |
| WO | 2012/049801 A1 | 4/2012 |

* cited by examiner

*Primary Examiner* — John E Breene
*Assistant Examiner* — Manuel Castellon
(74) *Attorney, Agent, or Firm* — Sughrue Mion, PLLC

(57) ABSTRACT

A bolometer having low resistance and a method for manufacturing the same are provided.
The present invention relates to a bolometer comprising two electrodes provided on a substrate and a bolometer film comprising carbon nanotubes, wherein
  the bolometer film is provided to connect an area of the top surfaces of the two electrodes, an area in contact with the electrode walls of the two electrodes, and an area between the two electrodes on the substrate; and
  the area density of the area of the bolometer film in contact with the electrode wall is less than or equal to the area density of the area between the electrodes on the substrate, or the film thickness of the area of the bolometer film in contact with the electrode wall is less than or equal to the film thickness of the area between the electrodes on the substrate.

10 Claims, 14 Drawing Sheets related art related art

BOLOMETER USING CARBON NANOTUBES

This application is based upon and claims the benefit of priority from Japanese patent application No. 2022-135902, filed on Aug. 29, 2022, the disclosure of which is incorporated herein in its entirety by reference.

TECHNICAL FIELD

The present invention relates to a bolometer using carbon nanotubes and a method for manufacturing the same.

BACKGROUND ART

Infrared sensors have a very wide range of applications such as not only monitoring cameras for security, but also thermography for human body, in-vehicle cameras, and inspection of structures, foods, and the like, and are thus actively used in industrial applications in recent years. In particular, development of a low-cost and high-performance uncooled infrared sensor capable of obtaining biological information in cooperation with IoT (Internet of Things) is expected. In the known uncooled infrared sensors, $VO_x$ (vanadium oxide) has been mainly used in the bolometer unit, but since a heat treatment under vacuum is required, there had been the problems of high process cost and low temperature coefficient resistance (TCR) thereof (about −2.0%/K).

Since a material having large resistance change against temperature change and high conductivity is required to improve TCR, semiconducting single-walled carbon nanotubes having a large band gap and carrier mobility are expected to be applied to the bolometer unit. Since carbon nanotubes are chemically stable, an inexpensive device manufacturing processes such as printing technology can be applied, and thus, there is a possibility that a low-cost and high-performance infrared sensor can be made.

For example, Patent Document 1 suggests applying typical single-walled carbon nanotubes to a bolometer unit, and producing a bolometer by a low-cost thin film process in which a dispersion is prepared by mixing single-walled carbon nanotubes in an organic solvent utilizing their chemical stability and then is applied on an electrode. In this case, TCR is successfully improved to about −1.8%/K by subjecting single-walled carbon nanotubes to annealing treatment in the air.

Single-walled carbon nanotubes typically contain nanotubes with semiconducting properties and nanotubes with metallic properties in a ratio of 2:1, and separation is thus required. In Patent Document 2, since metallic and semiconducting components are present in a mixed state in single-walled carbon nanotubes, semiconducting single-walled carbon nanotubes of uniform chirality are extracted using an ionic surfactant and applied to the bolometer unit, and TCR of −2.6%/K is thereby successfully achieved.

CITATION LIST

Patent Literature

Patent Document 1: WO 2012/049801
Patent Document 2: Japanese Patent Laid-Open No. 2015-49207

SUMMARY OF INVENTION

Technical Problem

However, not only improvement in TCR, but also improvement in characteristics such as resistance reduction is needed for implementation of infrared sensors (CNT non-cooling infrared sensors).

For example, since the bolometer portion of the CNT uncooled infrared sensor has a structure in which the electrodes are connected by a bolometer film containing carbon nanotubes, the bonding state between the carbon nanotubes and the electrodes affects the resistance. However, it may be difficult to reduce the resistance of the bolometer by conventional methods of forming a bolometer film of the bolometer.

Accordingly, an object of the present invention is to provide a bolometer having low resistance and a method for manufacturing the same.

Solution to Problem

One aspect of the present invention relates to:
a bolometer comprising two electrodes provided on a substrate and a bolometer film comprising carbon nanotubes, wherein
the bolometer film is provided to connect an area of the top surfaces of the two electrodes, an area in contact with the electrode walls of the two electrodes, and an area between the two electrodes on the substrate; and
the area density of the area of the bolometer film in contact with the electrode wall is less than or equal to the area density of the area between the electrodes on the substrate, or the film thickness of the area of the bolometer film in contact with the electrode wall is less than or equal to the film thickness of the area between the electrodes on the substrate.

Another aspect of the present invention relates to:
a method for manufacturing a bolometer comprising two electrodes provided on a substrate and a bolometer film comprising carbon nanotubes, the method comprising;
forming the bolometer film to connect the top surface of the two electrodes, the electrode wall of the two electrodes, and the area between the two electrodes on the substrate, by passing the substrate with electrodes formed on its surface through the liquid surface of the carbon nanotube dispersion at a moving speed such that the moving speed/number of times is 5 μm/sec or less.

Advantageous Effect of Invention

According to the present invention, a bolometer having low resistance and a method for manufacturing the same can be provided.

DESCRIPTION OF EMBODIMENTS

Figure 1:
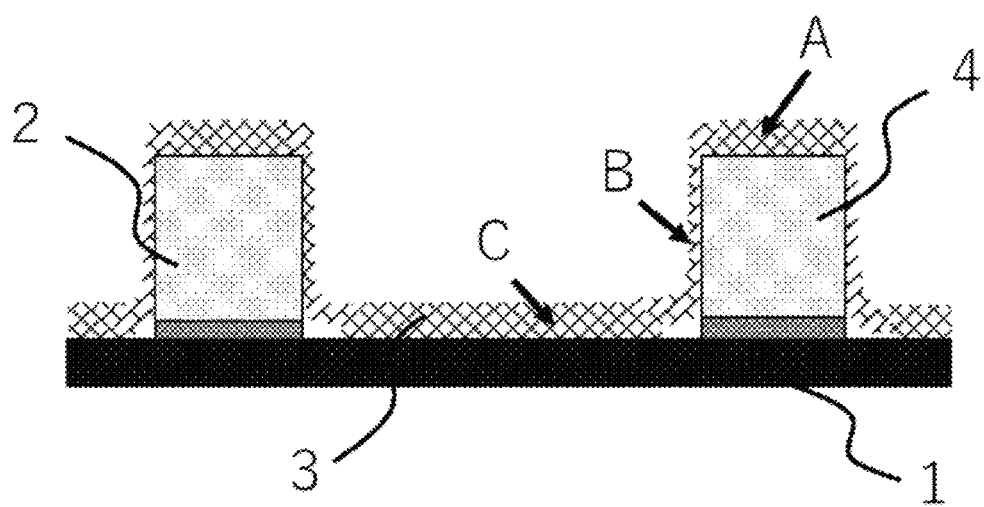
FIG. 1 is a schematic diagram (cross-sectional view) showing the structure of the bolometer of one embodiment of the present invention.

FIG. 1 is a cross-sectional view of an example of the bolometer of this embodiment. The bolometer of this embodiment has a first electrode 2 and a second electrode 4 on a substrate 1, and a bolometer film comprising carbon nanotubes 3 connecting the first electrode 2 and the second electrode 4 (hereinafter also referred to as "carbon nanotube film" or "CNT film").

Figure 13:
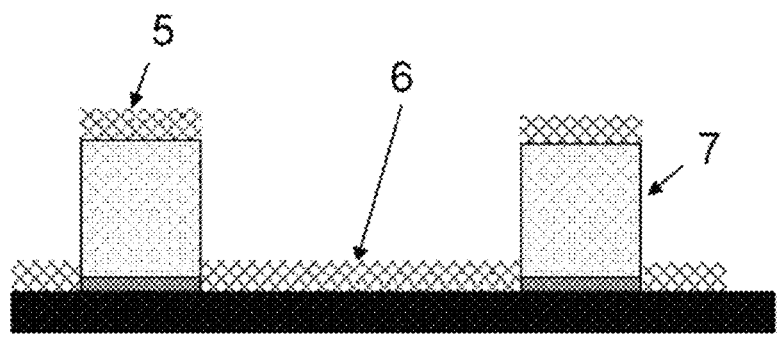
FIG. 13 is a schematic diagram (cross-sectional view) showing the structure of the bolometer of one conventional example.
Figure 14:
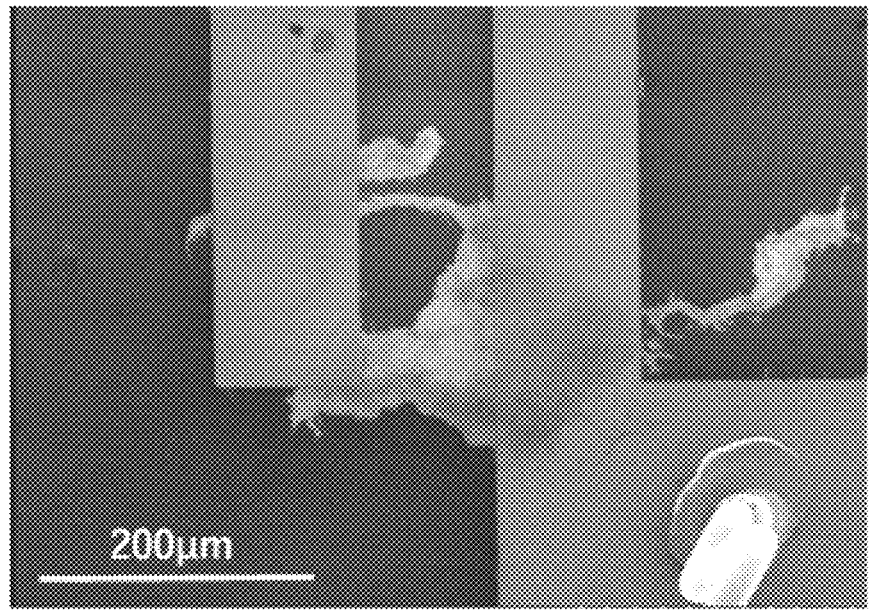
FIG. 14 is a SEM image of the bolometer film of one conventional example.

As the carbon nanotubes used for the bolometer film, carbon nanotubes having various lengths can be used depending on the purpose. However, if the length of carbon nanotubes is too short, the bolometer film is formed on the top surface of the two electrodes and the area between the two electrodes, and the carbon nanotubes on the top surface of the electrode are not connected to the bolometer film between the electrodes, as shown in FIG. 13. Therefore, it has been found that the carbon nanotubes on the top surface of the electrodes do not contribute as a component of the bolometer film. In addition, it has been found that when trying to fabricate a bolometer film across two electrodes, there is a problem that clusters of aggregated carbon nanotubes are irregularly partially formed on the electrodes, as shown in FIG. 14. There is a problem that such bolometers tend to have high resistance.

Figure 2:
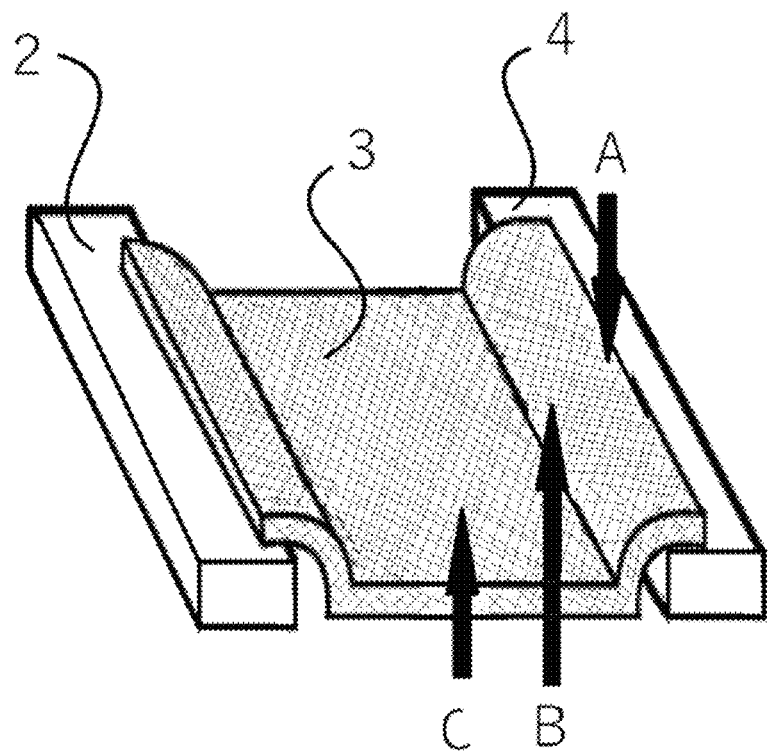
FIG. 2 is a schematic diagram (perspective view) showing the structure of the bolometer of one embodiment of the present invention.

On the other hand, in the bolometer of this embodiment, as shown in FIG. 1 and FIG. 2, a bolometer film 3 is formed to connect an area of the top surface of two electrodes 2 and 4 (also referred to as "Region A"), an area in contact with the electrode walls of the two electrodes (also referred to as "Region B"), and an area sandwiched between two electrodes on the substrate (also referred to as "Region C").

Furthermore, the bolometer of this embodiment is characterized in that the area density of Region B is equal to or less than the area density of Region C, or the film thickness of Region B is equal to or less than the film thickness of Region C.

With such a configuration, it is possible to reduce the resistance of the bolometer.

[Structure of Bolometer]

Each component of the bolometer of this embodiment will be described in detail.

1. Substrate

As the substrate, those used in bolometers can be used without limitation.

The substrate may be either a flexible substrate or a rigid substrate, and can be selected as appropriate. Preferably, at least the element forming surface is insulating or semiconducting. For example, inorganic materials such as Si, $SiO_2$-coated Si, $SiO_2$, SiN, and glass; and organic materials such as polymers, resins, and plastics, for example, parylene, polyimide, polyethylene, polypropylene, polystyrene, polyvinyl chloride, polyethylene terephthalate, acrylonitrile-styrene resin, acrylonitrile-butadiene-styrene resin, fluorine resin, methacrylic resin, polycarbonate, or the like can be used, but is not limited to these.

An intermediate layer that enhances adhesion between the substrate and the carbon nanotubes may be provided on the portion of the substrate surface where the carbon nanotubes are to be bonded. The intermediate layer is not particularly limited if it is a layer made of a material that enhances bonding between the substrate and the carbon nanotubes.

The material of the intermediate layer is preferably a compound having both a partial structure that bonds or adheres to the substrate surface and a partial structure that bonds or adheres to the carbon nanotube. Thereby, the intermediate layer functions as an intermediary that bonds the substrate and the carbon nanotubes. Here, the bond between the substrate and the intermediate layer and the bond between the intermediate layer and the carbon nanotube can utilize not only chemical bonds but also various intermolecular interactions such as electrostatic interaction, surface adsorption, hydrophobic interaction, Van der Waals force, and hydrogen bond. The material of the intermediate layer is also preferably a compound that increases the lyophilicity of the substrate surface.

Examples of the partial structure of the intermediate layer material that bonds or adheres to the substrate surface include an alkoxysilyl group (SiOR), SiOH, a hydrophobic moiety or a hydrophobic group, and the like. Hydrophobic moieties or hydrophobic groups include methylene groups (methylene chains), alkyl groups and the like having 1 or more, preferably 2 or more, and preferably 20 or less, more preferably 10 or less carbon atoms.

Examples of the partial structure of the intermediate layer material that binds or adheres to the carbon nanotube layer include amino groups such as a primary amino group ($-NH_2$), a secondary amino group ($-NHR_1$) and a tertiary amino group ($-NR^1R^2$), an ammonium group ($-NH_4$), an imino group ($=NH$), an imido group ($-C(=O)-NH-C(=O)-$), an amide group ($-C(=O) NH-$), an epoxy group, an isocyanurate group, an isocyanate group, an ureido group, a sulfide group, a mercapto group, and the like.

Examples of materials for such an intermediate layer are not particularly limited, but include silane coupling agents. A silane coupling agent has both a reactive group that binds or interacts with an inorganic material and a reactive group that binds or interacts with an organic material in its molecule, and acts to bind an organic material and an inorganic material. In this embodiment, carbon nanotubes can be immobilized on a substrate by forming a single-layer polymer film presenting reactive groups that bind to the carbon nanotubes on the substrate, for example, using a silane coupling agent that has both a reactive group that binds to a substrate such as a Si substrate and a reactive group that binds to a carbon nanotube.

Examples of silane coupling agents include:

silane coupling agents having an amino group and an alkoxysilyl group (aminosilane compounds) such as 3-aminopropyltrimethoxysilane, 3-aminopropylmethyltriethoxysilane, 3-aminopropylmethyltrimethoxysilane, 3-aminopropyltriethoxysilane 3-(2-(APTES), aminoethyl)aminopropyltrimethoxysilane, N-(2-aminoethyl)-3-N-2-(aminoethyl)-3-aminopropyltrimethoxysilane, aminopropylmethyltrimethoxysilane, N-(2-aminoethyl)-3-aminopropylmethyldimethoxysilane, and the like;

silane coupling agents having an epoxy group and an alkoxysilyl group 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxy cyclohexyl)ethyltrimethoxysilane, 3-glycidoxypropyldiethoxysilane, triethoxy (3-glycidyloxypropyl) silane, and the like;

isocyanurate-based silane coupling agents such as tris-(trimethoxysilylpropyl) isocyanurate, and the like;

ureido-based silane coupling agent such as 3-ureidopropyl trialkoxysilane, and the like;

mercapto-based silane coupling agent such as 3-mercaptopropylmethyldimethoxysilane, 3-mercaptopropyltrimethoxysilane, 3-mercaptopropyltriethoxysilane, and the like;

sulfide-based silane coupling agent such as bis(triethoxysilyl propyl) tetrasulfide, and the like; and isocyanate-based silane coupling agent such as 3-isocyanate propyltriethoxysilane, and the like.

In particular, a silane coupling agent having an amino group (aminosilane compound) is preferred because of its good binding with carbon nanotubes.

As used herein, the term "substrate" means any base material on which the bolometer film and electrodes of the present embodiment are formed and which supports the bolometer film and electrodes. The "substrate" is not limited to a flat substrate such as a glass plate or a silicon wafer, and may have a structure or a multilayer structure. Therefore, the bolometer of this embodiment is not limited to the forms shown in FIG. 1 and FIG. 2, and can be applied to a bolometer having a diaphragm structure and a bolometer having an optional layer such as a heat insulating layer under the bolometer film. For example, in the case of a bolometer having a diaphragm structure, a diaphragm having a gap as a heat insulating structure is provided, and the bolometer film of this embodiment and the electrodes are provided thereon. In this case, the entire base material including the diaphragm can be regarded as the "substrate". Further, in the case of a bolometer having a heat-insulating layer under the bolometer film, the heat-insulating layer and other layers that may be formed thereon as necessary can be considered as a "substrate", and the bolometer film of this embodiment and the electrodes will be provided on the substrate.

2. Electrodes

Electrodes used in bolometers can be used without limitations.

The material of the electrode is not particularly limited if it is conductive, but simple substances such as gold, platinum, titanium, copper, cobalt, nickel, carbon, palladium, iron, aluminum, silver, tungsten, zinc, chromium, tin, lead, magnesium, manganese, yttrium, niobium, vanadium, zirconium, molybdenum, indium, lanthanum, tantalum, hafnium, bismuth, ruthenium and rhodium and alloys containing them can be used singly or in combination.

Although the thickness of the electrode can be adjusted as appropriate, it is preferably 10 nm to 1 mm, more preferably 50 nm to 1 µm.

The distance between two electrodes is preferably 1 µm to 500 µm, more preferably 5 to 200 µm for miniaturization. When the distance is 5 µm or more, deterioration of TCR characteristics can be suppressed even when a small amount of metallic carbon nanotubes is included, for example. In addition, when the distance is 500 µm or less, it is advantageous for application to an image sensor using a two-dimensional array.

3. Bolometer Film

As explained above, the bolometer film (carbon nanotube film) of the bolometer of this embodiment is formed to connect the area of the top surface of the two electrodes 2 and 4 (Region A), the area in contact with the electrode walls of the two electrodes (Region B), and the area sandwiched between two electrodes on the substrate (Region C). Since the carbon nanotubes in Region A and the carbon nanotubes in Region C are connected by the carbon nanotubes in Region B, the carbon nanotubes in Regions A and B can be used as components of the bolometer film. As a result, the contact area between the electrodes and the carbon nanotube increases, and the resistance of the bolometer can be reduced.

The bolometer film may be a single carbon nanotube layer, or may include two or more carbon nanotube layers. When the bolometer film includes two or more carbon nanotube layers, if at least one layer is formed to connect Regions A, B, and C, the effect of lowering the resistance can be obtained.

Further, the bolometer of this embodiment is characterized in that the area density of the bolometer film in Region B is less than or equal to the area density of the bolometer film in Region C, or in that the thickness of the bolometer film in Region B is less than or equal to the thickness of the bolometer film in Region C.

In this embodiment, it may be either the area density of the bolometer film in Region B is less than or equal to the area density of the bolometer film in Region C or the thickness of the bolometer film in Region B is less than or equal to the thickness of the bolometer film in Region C; or both of the area density and thickness of the bolometer film in Region B may be less than or equal to the density and thickness of the bolometer film in Region C. In the present specification, these may be collectively described as "the area density and/or film thickness of the bolometer film in Region B is equal to or less than the areal density and/or film thickness of the bolometer film in Region C".

With such a configuration, it is possible to further reduce the resistance. The resistance of the bolometer is greatly affected by the contact state between the bolometer membrane and the electrode. In the bolometer film of this embodiment, the remaining impurities in the bolometer film, for example, surfactants described later can be reduced by suppressing the increase in the thickness and density of Region B, which is the area in direct contact with the electrode, thereby improving the contact state between the electrode and the bolometer film.

The film thickness and/or area density of the bolometer film in Region B are each independently preferably 95% or less, and more preferably 90% or less, of the film thickness and/or area density of the bolometer film in Region C. Although the lower limit is not particularly limited, it is preferably 30% or more, more preferably 50% or more.

Figure 11:
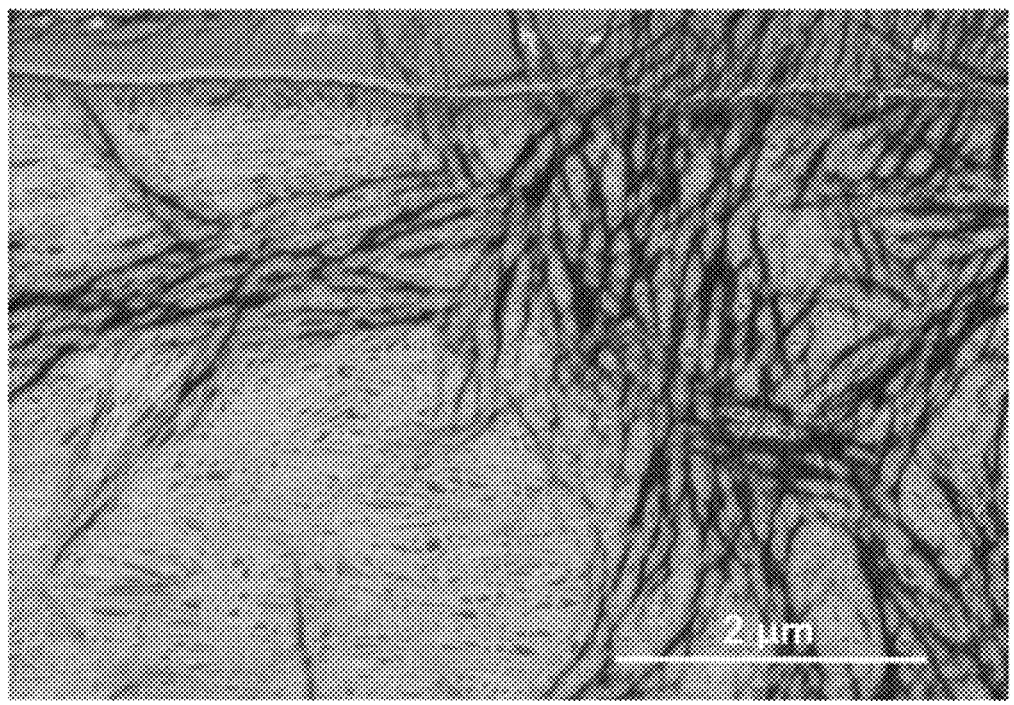
FIG. 11 is a SEM image of the bolometer film in Examples.

In addition, when the bolometer film is composed of two or more layers as in the case where the bolometer film includes an oriented layer described later, the upper layer may be formed to mainly connect Region A, Region B and Region C. The lower layer may be formed to connect Region A, Region B and Region C as described above, but it is not necessarily connected. By connecting the lower layer formed in Region A and Region C, or mainly in Region C, to the upper layers connected to the e electrodes in Region A and Region B, the resistance can be reduced. In this case, even if the upper layers are similarly formed in Region A, Region B and Region C, only the upper layer exists and there is almost no lower layer in Region B, or a lower layer having a smaller film thickness and area density than that of Region C exists in Region B. As a result, the film thickness and/or area density of the entire bolometer film in Region B is characterized by being equal to or less than the film thickness and/or area density of the entire bolometer film in Region C. In particular, when the lower layer is formed mainly only in Region C and is scarcely present in Region B, the film thickness and/or area density of the bolometer in Region B may be much smaller than the film thickness and/or area density of the bolometer in Region C (FIG. 11). In this case, the lower limits of the ratio of the film thickness and area density of Region B to Region C are not particularly limited, but from the viewpoint of lowering the resistance, they are each independently preferably 2% or more, and more preferably 5% or more.

In this specification, values measured in the central region of each area can be used as the values of the film thickness and area density of each area of the bolometer film.

Figure 3:
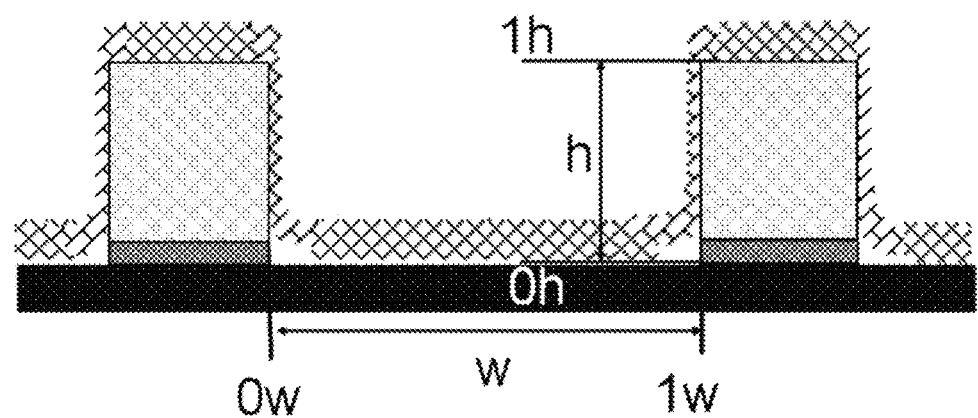
FIG. 3 is a s schematic diagram (cross-sectional view) showing the structure of the bolometer of one embodiment of the present invention.

The region b for measuring the film thickness and areal density of Region B can be the central 60% area of Region B. For example, as shown in FIG. 3, assuming that the height of the electrode is h, the area is a range of 0.6 h around the center line of the height h, specifically, the area is a range of 0.2 h to 0.8 h when the lower end of the electrode is 0 h and the upper end is 1 h. As will be described later, the area density and film thickness of the region b can be the average value of the values measured at 10 random points included in the region b.

Similarly, the region c for measuring the film thickness and areal density of Region C can be the central 60% area of Region C. For example, as shown in FIG. 3, assuming that the distance between the electrodes is w, the area is a range of 0.6 w around the center line of the distance w, specifically, the area is a range of 0.2 h to 0.8 h when the left end of the electrode is 0 w and the right end is 1 w. As will be described later, the area density and film thickness of the region c can be the average value of values measured at 10 random points included in the region c.

Area Density

The area density can be measured as the carbon nanotube occupancy of the region b and the region c defined above. The carbon nanotube occupancy can be obtained from the following formula by calculating the area occupied by carbon nanotubes and the area of gaps (the area not occupied by carbon nanotubes) at each measurement point using image software.

Carbon nanotube occupancy=the area occupied by carbon nanotubes/(the area occupied by carbon nanotubes+the area of gap)

The image software is not particularly limited, but Win-ROOF or the like can be used. The area density can be obtained, for example, by calculating the carbon nanotube occupancy of 10 random measurement points (the area of each measurement point is 100 nm×1 μm) in each of the SEM images of the region b and the region c, and calculating the average value thereof.

If the bolometer film contains materials other than carbon nanotubes, the area occupied by the other materials shall be included in the area occupied by carbon nanotubes.

In addition, when the bolometer film is composed of two or more layers, such as the case where the bolometer film includes an oriented layer described later, the area density refers to the total area density of the two or more layers of the bolometer film. In the case of a bolometer film having two or more layers, when the layer provided to connect t Region A, Region B and Region C is only the upper layer, since the upper layer has a lower area density than the lower layer, the area density of Region B is clearly lower than that of Region C. In the case of two or more such layers, the upper layer may or may not be oriented.

Film Thickness

The film thickness can be obtained by measuring the film thickness at 10 random measurement points in each of the region b and the region c defined above and taking the average value thereof. The film thickness can be measured using an SEM image, a cross-sectional TEM, a laser microscope, or the like.

When the bolometer film is composed of two or more layers, the film thickness means the total thickness of all layers.

Further, in one embodiment, the film thickness and/or area density in the entire Region A to Region C of the bolometer film are each independently 1.2 times or less of the film thickness and/or are density of the region c, for example, equal to or less than the film thickness and/or area density of the region c. Depending on the manufacturing method of the bolometer film, liquid pools of the carbon nanotube dispersion may occur at the corners where the electrode and the substrate are in contact (both ends of Region C), resulting in a thick bolometer film. On the other hand, in the manufacturing method of this embodiment, which will be described later, such liquid pools are less likely to occur, so thick portions are less likely to occur in the bolometer film, and a uniform and low-resistance bolometer film can be manufactured.

The thickness of the bolometer film (in this specification, referred to as the thickness of Region C (the region c)) is not particularly limited, but is, for example, 1 nm or more, for example, several nm to 100 μm, preferably 5 nm to 10 μm, more preferably 10 nm to 1 μm, more preferably 15 nm to 500 nm, particularly preferably 15 nm to 200 nm.

When the thickness of the bolometer film is 1 nm or more, a good light absorption rate can be obtained.

Further, when the thickness of the bolometer film is 10 nm or more, preferably 15 nm or more, a sufficient light absorption rate can be obtained without providing a light reflection layer or a light absorption material layer, so that the device structure can be simplified.

Moreover, the thickness of the bolometer film is 1 μm or less, preferably 500 nm or less, from the viewpoint of simplification of the manufacturing method.

When a light reflecting layer or a light absorbing material layer is provided, the thickness of the bolometer film may be made thinner than the above range to further simplify the manufacturing process and improve the resistance value.

When the bolometer film consists of two or more layers as in the case where the bolometer film includes an oriented layer described later, the total thickness of all layers is preferably within the above range.

Further, the density of the bolometer film (herein, it is the density of Region C (the region c)) is, for example, 0.03 $g/cm^3$ or more, preferably 0.1 $g/cm^3$ or more, more preferably 0.3 $g/cm^3$ or more. Although the upper limit is not particularly limited, it can be the upper limit of the true density of the carbon nanotubes used (for example, about 1.4 $g/cm^3$).

When the density of the bolometer film is 0.03 $g/cm^3$ or more, a good light absorbance can be obtained.

Further, when the density of the bolometer film is 0.1 $g/cm^3$ or more, a sufficient light absorption rate can be obtained without providing a light reflecting layer or a light absorbing material layer, and the element structure can be simplified.

When a light reflecting layer or a light absorbing material layer is provided, the density of the bolometer film may be appropriately selected to be lower than the above.

When the bolometer film consists of two or more layers as in the case where the bolometer film includes an oriented layer described later, the average density of all layers is preferably within the above range.

The density of the bolometer film can be calculated by the weight, the area and the thickness calculated above of the bolometer film.

As described above, the bolometer film of this embodiment may be a single carbon nanotube layer or may include two or more carbon nanotube layers.

When the bolometer film is composed of one carbon nanotube layer, the carbon nanotube layer may be an unoriented layer or an oriented layer.

When the bolometer film includes two or more carbon nanotube layers, all layers may be unoriented layers, all layers may be oriented layers, or a combination of non-oriented and oriented layers may be used.

A preferred example of a bolometer film including two or more carbon nanotube layers is a bolometer film in which one layer is an oriented layer and the other layer is a non-oriented layer, for example, a layer in which carbon nanotubes are oriented in various directions to form a dense network structure. Not only the contact area between carbon nanotubes in the oriented layer is increased by overlapping the oriented layer on the unoriented layer, but also the number of conductive paths is further increased by overlapping the carbon nanotubes of the oriented layer with the carbon nanotubes of the unoriented layer having a high density, and the resistance is lowered. This makes it possible to achieve a low resistance and a large resistance change with respect to temperature changes (high TCR).

In another example, the bolometer film may consist of two or more unoriented layers. For example, the effect of lowering the resistance can be also obtained by overlapping an unoriented carbon nanotube layer having high density with an unoriented carbon nanotube layer provided to connect the top surfaces of the two electrodes, the electrode walls of the two electrodes, and the area between the two electrodes on the substrate.

In this specification, the term "oriented layer" refers to a layer in which at least a portion of the carbon nanotubes are oriented. The orientation degree of the oriented layer will be described later. A "unoriented layer" (unoriented carbon nanotube layer) is a layer in which the carbon nanotubes are oriented in different directions, preferably a layer in which the carbon nanotubes are oriented in various directions to form a network-like structure, for example, "unoriented layer" refers to a layer having an orientation degree fx/fy of less than 1.5.

In addition, when the bolometer film comprises two or more carbon nanotube layers, "bolometer film is provided to connect the top surfaces of the two electrodes, the electrode walls of the two electrodes, and the area between the two electrodes on the substrate" means that the bolometer film as a whole should be formed to connect the above areas. For example, all the layers constituting the bolometer film may be provided to connect the top surface of the two electrodes, the electrode wall of the two electrodes, and the area between the two electrodes on the substrate, or a bolometric film may totally connect the top surface of the two electrodes, the electrode wall of the two electrodes, and an area between the two electrodes on the substrate by forming only some layers therein so as to connect the top surface of the two electrodes, the electrode wall of the two electrodes, and the area between the two electrodes on the substrate. When the bolometer film comprises an oriented layer, at least the oriented layer is preferably provided to connect the top surface of the two electrodes, the electrode wall of the two electrodes, and the area between the two electrodes on the substrate from the viewpoint of reducing the resistance.

The orientation degree of carbon nanotubes can be defined as the value of fx/fy. In a plane FFT image in which the SEM image of the carbon nanotube film is processed by two-dimensional fast Fourier transform and the unevenness distribution in each direction is represented by the frequency distribution, the integrated value f of amplitude (intensity) from frequency $-1$ $\mu m^{-1}$ to $+1$ $\mu m^{-1}$ in one direction from the center (one direction passing through the center) is calculated, the integrated value for the direction x in which the integrated value f is maximum is fx, and the integrated value for the direction y vertical to the direction x is fy. In the oriented layer in this embodiment, fx/fy is preferably greater than or equal to 1.5, and fx/fy is more preferably greater than or equal to 1.8. The SEM image, which is the basis of the above FFT image, must show unevenness for calculation by Fourier transform. From the viewpoint of observing carbon nanotubes, the viewing range is preferably about 0.05 to 50 μm in length and width.

It is preferable that at least the orientation degree in Region C (the region c) is within the above range.

Figure 4:
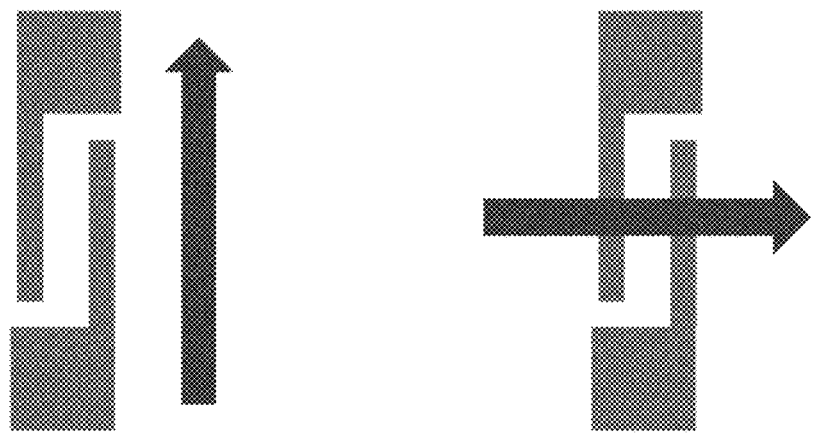
FIG. 4 is a diagram (top view) showing the orientation direction of carbon nanotubes in the present invention.

The orientation direction of the carbon nanotubes may be parallel to the electrodes (vertical to the direction of current flow (FIG. 4, left)) or vertical to the electrodes (parallel to the direction of current flow (FIG. 4, right)). If the orientation direction of the carbon nanotubes is vertical to the electrodes (parallel to the direction of current flow), a higher effect of lowering the resistance can be obtained compared to the case where the carbon nanotubes are not oriented and oriented parallel to the electrodes.

The carbon nanotubes used for the bolometer film are explained.

A carbon nanotube film (CNT film) as a bolometer film is a thin film mainly composed of a plurality of carbon nanotubes forming a conductive path electrically connecting two electrodes. Carbon nanotubes, for example, preferably have a network-like structure, and preferably form a three-dimensional network-like structure that does not easily aggregate and provides a uniform conductive path. Further, it is more preferable to form a layer having a structure in which the carbon nanotubes are oriented above or below the network-like structure of the carbon nanotubes.

As carbon nanotubes, single-walled, double-walled, and multi-walled carbon nanotubes can be used, but when separating semiconducting types, single-walled or several-walled (for example, double-walled or triple-walled) carbon nanotubes are preferred, and single-walled carbon nanotubes are more preferred. Carbon nanotubes preferably contain 80% by mass or more of single-walled carbon nanotubes, more preferably 90% by mass or more (including 100% by mass).

Semiconducting carbon nanotubes, which have a large bandgap and carrier mobility are used for the bolometer film. The content of semiconducting carbon nanotubes is generally 67% by mass or more, preferably 70% by mass or more, more preferably 80% by mass or more of the total amount of carbon nanotubes. In particular, the semiconducting carbon nanotubes are preferably contained in a ratio of 90% by mass or more, more preferably 95% by mass or more, and even more preferably 99% by mass or more (including 100% by mass) of the total amount of carbon nanotubes.

The diameter of the carbon nanotube is preferably between 0.6 and 1.5 nm, more preferably between 0.6 and 1.4 nm, and more preferably between 0.7 and 1.2 nm, from the viewpoint of increasing the bandgap and improving the TCR. Also, in one embodiment, the diameter of the carbon nanotube may be preferably 1 nm or less. If the diameter of the carbon nanotube is 0.6 nm or more, they are easier to manufacture. If the diameter of the carbon nanotube is 1.5 nm or less, the bandgap can be easily maintained within an appropriate range, and a high TCR can be obtained.

In this specification, the diameter of the carbon nanotube is measured by observing the carbon nanotube film using an atomic force microscope (AFM) and measuring the diameter at about 100 points, and 60% or more, preferably 70%. % or more, optionally preferably 80% or more, more preferably 100% of them have a diameter of 0.6 to 1.5 nm. Preferably, 60% or more, preferably 70% or more, optionally preferably 80% or more, more preferably 100% of the diameter of the carbon nanotube is within the range of 0.6 to 1.4 nm, more preferably within the range of 0.7 to 1.2 nm. Also, in one embodiment, 60% or more, preferably 70% or more, optionally preferably 80% or more, and more preferably 100% are within the range of 0.6 to 1 nm.

Further, the length of the carbon nanotube is more preferably between 100 nm and 5 μm because it is easy to disperse and is excellent in coatability. From the viewpoint of the conductivity of carbon nanotubes, the length of the carbon nanotube is preferably 100 nm or more. Also, if the length of the carbon nanotube is 5 μm or less, it is easy to suppress aggregation during film formation. The length of the carbon nanotube is more preferably 300 nm to 4 μm, still more preferably 500 nm to 3 μm.

When the bolometer film is composed of two or more carbon nanotube layers, carbon nanotubes having a length within the above range are used for at least one carbon nanotube layer.

In this specification, the length of the carbon nanotube is measured by observing at least 100 carbon nanotubes using an atomic force microscope (AFM) and counting them to measure the length distribution of carbon nanotubes, and 60% or more, preferably 70%. % or more, optionally preferably 80% or more, more preferably 100% of them have a length of 100 nm to 5 μm. Preferably, 60% or more, preferably 70% or more, optionally preferably 80% or more, more preferably 100% of the length of the carbon nanotube is within the range of 300 nm to 4 μm, more preferably, 60% or more, preferably 70% or more, optionally preferably 80% or more, and more preferably 100% are within the range of 500 nm to 3 μm.

When the diameter and length of the carbon nanotube are within the above ranges, the effect of semiconducting properties is increased, and a large current value can be obtained, so that when used as a bolometer film, a high TCR value is likely to be obtained.

Moreover, in addition to the components described above, for example, ion conductive agents (surfactants, ammonium salts, inorganic salts), oxides, resins, organic binders, and the like may be used as appropriate. in the bolometer film.

The content of carbon nanotubes in the bolometer film can be selected as appropriate, but is preferably 0.1% by mass or more, more preferably 1% by mass or more, for example, 30% by mass, preferably 50% by mass or more, and in some cases, 60% by mass or more, based on the total mass of the bolometer film.

5. Other Components

In addition to the above, the bolometer of this embodiment may comprise any component used in a bolometer.

For example, a protective film can be provided on the surface of the bolometer film, if necessary. The protective film is preferably made of a material having high transparency in the light wavelength region to be detected. Examples of materials for the protective film include acrylic resins such as PMMA and PMMA anisole, epoxy resins, Teflon (registered trademark), silicon nitride, and silicon oxide ($SiO_2$).

Moreover, a light absorption structure such as a light absorption layer may be provided on the upper side of the bolometer film (the side on which light is incident), if necessary. Examples of the light absorption layer provided on the protective layer include a thin film of titanium nitride, and examples of the light absorption layer provided on the bolometer film include a coating film of polyimide, but the invention is not limited to these.

The bolometer of this embodiment detects temperature using the temperature dependence of electrical resistance due to light irradiation. The bolometer of this embodiment is preferably an infrared sensor. Moreover, even in frequency regions other than infrared rays, if the temperature changes due to light irradiation, it can be used similarly. The bolometer of this embodiment using a bolometer film containing carbon nanotubes can be particularly suitably used for detecting electromagnetic waves having a wavelength of 0.7 μm to 1 mm. Examples of electromagnetic waves included in this wavelength range include infrared rays and terahertz waves.

Also, the change in electrical resistance due to temperature change can be detected not only by the structure in FIG. 1, but also amplifying the resistance value change by providing a gate electrode to form a field effect transistor.

In addition, the bolometer of this embodiment is not limited to the structure shown in FIG. 1. It can be applied to an element structure normally used in a bolometer, such as an element having a desired heat insulating structure such as a heat insulating layer made of heat insulating resin, instead of an element having diaphragm structure and diaphragm structure.

Although the basic configuration of the bolometer of this embodiment has been described above, the element structure and array structure that can be used for the bolometer can be applied to the bolometer of this embodiment without limitation. For example, the bolometer of this embodiment may be a single element, or may be an array in which a plurality of elements such as those used in image sensors are arranged two-dimensionally.

[Method for Manufacturing Bolometer]

One aspect of the present invention relates to a method for manufacturing a bolometer.

According to the manufacturing method of this embodiment, as shown in FIG. 1 and FIG. 2, the bolometers in which Region A on the electrode upper surface of the bolometer film and Region C between the electrodes on the substrate are connected by Region B in contact with the electrode wall can be manufactured.

In one embodiment, according to the manufacturing method of this embodiment, the bolometer in which the area density of the bolometer film in Region B is equal to or less than the area density of the bolometer film in Region C, or the film thickness of the bolometer film in Region B is less than or equal to the film thickness of the bolometer film of Region C can be manufactured.

1. Step of Forming Two Electrodes on Substrate

Two electrodes are formed spaced apart from each other on the substrate.

The method of manufacturing the electrodes is not particularly limited, but they can be formed by vapor deposition, sputtering, printing, pressing, or the like. Alternatively, a desired shape may be formed using a photomask, a metal mask, or the like. Alternatively, a pre-formed metal thin film or the like may be used.

Figure 5:
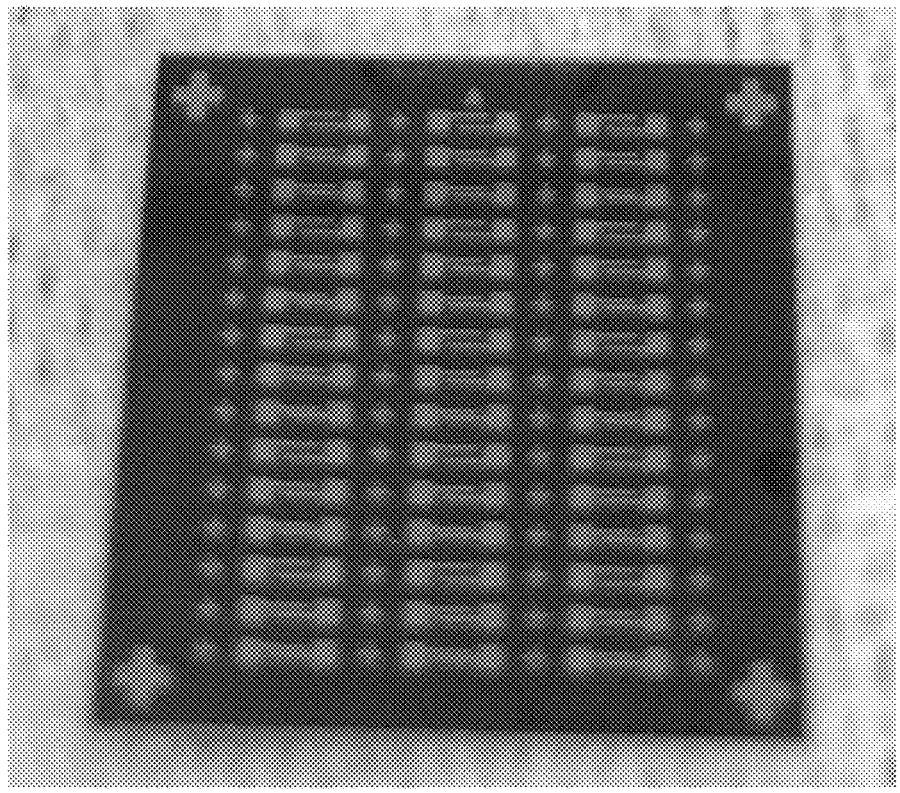
FIG. 5 is a diagram showing an example of a bolometer array of one embodiment of the invention.

In addition, as shown in FIG. 5, a plurality of electrode pairs may be arranged in the vertical and horizontal directions on a substrate to form an array.

In one embodiment, an intermediate layer may be formed on the substrate. A case where the intermediate layer is the APTES layer will be described as an example, but the intermediate layer is not limited to the APTES layer.

The intermediate layer can be formed by applying an APTES aqueous solution onto the substrate, washing with water, and drying if necessary.

The APTES solution may be applied by immersing the substrate in the APTES aqueous solution, or by spraying the APTES aqueous solution onto the substrate. Before applying the APTES aqueous solution, areas other than the area where the intermediate layer is to be formed may be protected with various mask materials.

The concentration of the APTES aqueous solution is preferably 0.001% by volume or more and 30% by volume or less, more preferably 0.01% by volume or more and 10% by volume or less, and even more preferably 0.05% by volume or more and 5% by volume or less. Of course, when a compound other than APTES is used for the intermediate layer, the concentration and solvent may be changed as appropriate according to the compound used.

2. Step of Preparing Carbon Nanotube Dispersion

In the production method of this embodiment, it is preferable to use a carbon nanotube dispersion liquid containing carbon nanotubes for producing the bolometer film.

The carbon nanotubes used in the carbon nanotube dispersion may be heat-treated in vacuum under an inert atmosphere to remove surface functional groups, impurities such as amorphous carbon, catalysts, and the like. The heat treatment temperature can be selected as appropriate, but is preferably 800 to 2000° C., more preferably 800 to 1200° C.

A surfactant is preferably added to the carbon nanotube dispersion.

The surfactant is preferably a nonionic surfactant from the viewpoint that it can be easily removed. The nonionic surfactant can be selected as appropriate, but it is preferable to use one type or a combination of a plurality of nonionic surfactants composed of non-ionized hydrophilic sites and hydrophobic sites such as alkyl chains, for example, nonionic surfactants having a polyethylene glycol structure represented by polyoxyethylene alkyl ethers, and alkyl glucoside nonionic surfactants. As such a nonionic surfactant, a polyoxyethylene alkyl ether represented by formula (1) is preferably used. Also, the alkyl moiety may contain one or more unsaturated bonds.

$$C_nH_{2n+1}(OCH_2CH_2)_mOH \quad (1)$$

(wherein n=preferably 12 to 18, m=10 to 100, preferably 20 to 100)

Especially, nonionic surfactants defined by polyoxyethylene(n)alkyl ether (n is 20 or more and 100 or less, and the alkyl chain length is C12 or more and C18 or less) such as polyoxyethylene(23)lauryl ether, polyoxyethylene(20)cetyl ether, polyoxyethylene(20)stearyl ether, polyoxyethylene(10)oleyl ether, polyoxyethylene(10)cetyl ether, polyoxyethylene(10)stearyl ether, polyoxyethylene(20)oleyl ether, polyoxyethylene(100)stearyl ether are more preferred. N,N-bis [3-(D-gluconamide)propyl]deoxycholamide, n-dodecyl β-D-maltoside, octyl β-D-glucopyranoside and digitonin can also be used.

Polyoxyethylene sorbitan monostearate (for example, molecular formula: $C_{64}H_{126}O_{26}$, trade name: Tween 60 manufactured by Sigma-Aldrich), polyoxyethylene sorbitan trioleate (for example, molecular formula: $C_{24}H_{44}O_6$, trade name: Tween 85 manufactured by Sigma-Aldrich), octylphenol ethoxylate (for example, molecular formula: $C_{14}H_{22}O(C_2H_4O)$ n, n=1 to 10, trade name: Triton X-100 manufactured by Sigma-Aldrich), polyoxyethylene(40) isooctyl phenyl ether (for example, molecular formula: $C_8H_{17}C_6H_{40}(CH_2CH_{20})_{40}H$, trade name: Triton X-405 manufactured by Sigma-Aldrich), Poloxamer (for example, molecular formula: $C_5H_{10}O_2$, trade name: Pluronic manufactured by Sigma-Aldrich), polyvinylpyrrolidone (for example, molecular formula: $(C_6H_9NO)_n$, n=5 to 100, manufactured by Sigma-Aldrich), and the like can also be used as nonionic surfactants.

The dispersibility of carbon nanotubes can be improved by using a nonionic surfactant.

Moreover, if a large amount of impurities such as surfactants remain in the carbon nanotube film, a sufficient bond may not be formed between the electrodes and the carbon nanotube. Since the nonionic surfactant can be easily removed by a heat treatment or the like, which will be described later, the residual amount of the nonionic surfactant in the carbon nanotube film can be reduced, thereby improving the contact between the electrodes and the carbon nanotube film. In one embodiment, the surfactant in the bolometer film is preferably removed to reduce the residual amount of surfactant, as described below, and in one embodiment, the bolometer membrane substantially does not comprise a surfactant. The bolometer film substantially does not comprise a surfactant means that the residual concentration of the surfactant is preferably 0.01% by mass or less, more preferably 0.001% by mass or less, based on the total mass of the bolometer film.

In particular, the bolometer of this embodiment has the advantage of being able to reduce residual impurities such as surfactants by suppressing increases in the film thickness and density of the bolometer film in Region B in contact with the electrode wall.

A method for obtaining a carbon nanotube dispersion is not particularly limited, and a conventionally known method can be applied. For example, a carbon nanotube mixture, a dispersion medium, and a nonionic surfactant are mixed to prepare a solution containing carbon nanotubes, and this solution is subjected to ultrasonic treatment to disperse the carbon nanotubes, resulting in a carbon nanotube dispersion (micelle dispersion solution) is prepared. The dispersion medium is not particularly limited if it can disperse and float the carbon nanotubes during the separation step. For example, water, heavy water, organic solvents, ionic liquids, or mixtures thereof can be used as a dispersion medium, and water and heavy water are preferred. In addition to or in place of the sonication described above, mechanical shear force dispersing techniques of carbon nanotubes may be used. Mechanical shearing may be performed in the gas phase. The carbon nanotubes are preferably in an isolated state in the micelle-dispersed aqueous solution of the carbon nanotubes and the nonionic surfactant. Therefore, bundles, amorphous carbon, impurity catalysts, and the like may be removed by ultracentrifugation, if necessary. During the dispersion treatment, the carbon nanotubes can be cut, and the length of the carbon nanotubes can be controlled by changing the crushing conditions of the carbon nanotubes, the ultrasonic output, the ultrasonic treatment time, and the like. For example, untreated carbon nanotubes can be pulverized with tweezers, ball mills, etc. to control aggregate size. After these treatments, an ultrasonic homogenizer is used to control the length of the carbon nanotubes to 100 nm to 5 μm by setting the output to 40 to 600 W, optionally 100 to 550 W, 20 to 100 KHz, treatment time 1 to 5 hours, preferably to 3 hours. If the treatment time is shorter than 1 hour, depending on the conditions, there may be little dispersion and the original length may be maintained. In addition, from the viewpoint of shortening the dispersion processing time and reducing the cost, 3 hours or less is preferable. This embodiment may also have the advantage of easier control of cutting due to the use of non-ionic surfactants. It also has the advantage of not containing an ionic surfactant that is difficult to remove.

Dispersion and cutting of carbon nanotubes create surface functional groups on the surface or edges of the carbon nanotubes. The functional groups generated are carboxyl groups, carbonyl groups, hydroxyl groups, and the like. If the treatment is in the liquid phase, carboxyl groups and hydroxyl groups are generated, and if the treatment is in the gas phase, carbonyl groups are generated.

The concentration of the surfactant in the liquid comprising heavy water or water and the nonionic surfactant is preferably from the critical micelle concentration to 10% by mass, more preferably from the critical micelle concentration to 3% by mass. If the concentration of the surfactant is less than the critical micelle concentration, the particles cannot be dispersed, which is not preferable. If the concentration of the surfactant is 10% by mass or less, carbon nanotubes with a sufficient density can be applied after separation while reducing the amount of surfactant. As used herein, the critical micelle concentration (CMC) refers to the concentration at which the surface tension reaches an inflection point, for example, by measuring the surface tension by changing the concentration of the surfactant aqueous solution at a constant temperature, using a surface tensiometer such as a Wilhelmy surface tensiometer, for example. As used herein, the "critical micelle concentration" is a value at 25° C. under atmospheric pressure.

The concentration of carbon nanotubes in the cutting and dispersing step described above (weight of carbon nanotube/(total weight of carbon nanotube, dispersion medium, and surfactant)×100) is not particularly limited, but is, for example, 0.0003 to 10% by mass, preferably 0.001 to 3% by mass, more preferably 0.003 to 0.3% by mass.

The dispersion obtained through the cutting/dispersing step described above may be used as it is in the separation step described later, or may be subjected to steps such as concentration and dilution prior to the separation step.

Since carbon nanotubes are usually a mixture of semiconducting carbon nanotubes and metallic carbon nanotubes, it is preferable to separate or concentrate the semiconducting carbon nanotubes before use.

Separation of carbon nanotubes can be performed, for example, by an electric field induced layer formation method (ELF method: see, for example, K. Ihara et al. J. Phys. Chem. C. 2011, 115, 22827-22832, Japanese Patent No. 5717233, which documents are incorporated herein by reference). An example of the separation method using the ELF method will be described. Carbon nanotubes, preferably single-walled carbon nanotubes, are dispersed with a nonionic surfactant, the dispersion is placed in a vertical separation device, and a voltage is applied to electrodes arranged above and below to perform carrier-free electrophoresis. The separation mechanism can be presumed, for example, as follows. When carbon nanotubes are dispersed with a nonionic surfactant, semiconducting carbon nanotube micelles have a negative zeta potential, while metallic carbon nanotube micelles have an opposite sign (positive) zeta potential (in recent years, metallic carbon nanotube micelles are also believed to have a slightly negative zeta potential or be nearly uncharged). Therefore, when an electric field is applied to the carbon nanotube dispersion, the conductive carbon nanotube micelles are electrophoresed toward the anode (+) and the metallic carbon nanotube micelles are electrophoresed toward the cathode (−) due to the difference in zeta potential. Ultimately, a layer of concentrated semiconducting carbon nanotubes is formed near the anode, and a layer of concentrated metallic carbon nanotubes is formed near the cathode in the separation tank. The separation voltage can be appropriately set in consideration of the composition of the dispersion medium, the charge amount of the carbon nanotubes, and the like, and is preferably 1 V or more and 200 V or less, more preferably 10 V or more and 200 V or less. A voltage of 100 V or more is preferable from the viewpoint of shortening the time of the separation process. In addition, from the viewpoint of suppressing the generation of bubbles during separation and maintaining the separation efficiency, the voltage is preferably 200 V or less. Purity is improved by repeating the separation. The dispersion after separation may be reset to the initial concentration and the same separation operation may be performed. Thereby, it can be further purified.

A dispersion in which semiconducting carbon nanotubes having desired diameters and lengths are concentrated can be obtained by the dispersing/cutting and separating of carbon nanotube described above. In this specification, a carbon nanotube dispersion in which semiconducting carbon nanotubes are concentrated may be referred to as a "semiconducting carbon nanotube dispersion". The semiconducting carbon nanotube dispersion obtained by the separation step means a dispersion comprising generally 67% by mass or more, preferably 70% by mass or more, more preferably 80% by mass or more, particularly preferably 90% by mass or more, more preferably 95% by mass or more, still more preferably 99% by mass or more (t the upper limit may be 100% by mass) of semiconducting carbon nanotubes in the total amount of carbon nanotubes. The tendency of metallic and semiconducting carbon nanotubes to separate can be analyzed by microscopic Raman spectrometry and ultraviolet-visible-near-infrared spectrophotometry.

A centrifugal separation process may be performed to remove bundles, amorphous carbon, metal impurities, and the like from the carbon nanotube dispersion after the above-described carbon nanotube dispersion/cutting process and before the separation process. The centrifugal acceleration can be appropriately adjusted, but is preferably 10,000×g to 500,000×g, more preferably 50,000×g to 300,000×g, and optionally may be 100,000×g to 300,000×g. The centrifugation time is preferably 0.5 to 12 hours, more preferably 1 to 3 hours. The centrifugation temperature can be appropriately adjusted, but is preferably 4° C. to room temperature, more preferably 10° C. to room temperature.

The concentration of the surfactant in the carbon nanotube dispersion after separation can be appropriately controlled. The concentration of the surfactant in the carbon nanotube dispersion is preferably about the critical micelle concentration to 0.5% by mass, more preferably 0.001% to 0.3% by mass, 0.01 to 0.1% by weight is particularly preferred in order to suppress reaggregation after coating.

3. Step of Forming Bolometer Film

As described above, a bolometer film is formed by forming an electrode on the surface and passing the substrate, which has been subjected to surface treatment, if necessary, through the liquid surface of the carbon nanotube dispersion liquid. The present inventors have found for the first time that the bolometer film can be formed in which Region A on the top surface of the electrode and Region C between the electrodes on the substrate are connected through Region B in contact with the electrode wall, and that the resistance of the bolometer can be reduced, by setting the moving speed of the substrate when passing through the liquid surface of the carbon nanotube dispersion to a predetermined range, The moving speed for passing the substrate through the liquid surface of the carbon nanotube dispersion is 5 μm/second or less, preferably 3 μm/second or less, and more preferably 2 μm/second or less.

In addition, the step of passing the carbon nanotubes through the liquid surface may be performed twice or more. In this case, the moving speed/times of moves may be 5 μm/second or less, and preferably 3 μm/second or less, and more preferably 2 μm/sec or less. From the viewpoint of forming a homogeneous film, the number of times of moving is preferably 5 times or less, more preferably 3 times or less, and still more preferably 1 time.

In addition, although the lower limit of moving speed/number of times of moving is not limited, it is 0.01 μm/second or more, preferably 0.02 μm/second or more.

The moving speed can be appropriately adjusted by the thickness of the electrode.

In one example, when the height of the electrode is 50 nm to 150 nm, for example, around 100 nm, the moving speed (moving speed/number of times of moving) is preferably 5 μm/second or less, preferably 2 μm/second or less, and when the electrode height is more than 150 nm to 300 nm, for example around 250 nm, the moving speed (moving speed/number of times of moving) is preferably 2 μm/second or less, more preferably 1 μm/second or less.

Note that the moving speed can be appropriately adjusted according to humidity, temperature, and the like. Humidity and temperature to which the above moving speed can be applied are 10 to 90% RH, preferably 30 to 80% RH, 5 to 40° C., preferably 15 to 30° C.

In addition, the moving speed can be appropriately adjusted depending on the concentration of carbon nanotubes in the carbon nanotube dispersion to be used, the film thickness to be produced, and the like.

Furthermore, the inventors have found that a desired morphology of the bolometer film can be formed by further adjusting the moving speed.

For example, a bolometer film composed of two or more carbon nanotube layers can be formed by reducing the moving speed/number of times of moving to 0.8 μm/second or less, preferably 0.5 μm/second or less.

Furthermore, the present inventors have found that a bolometer film can be formed while aligning at least a portion of the carbon nanotubes approximately parallel to the liquid surface of the carbon nanotube dispersion (i.e. approximately vertical to the direction of movement of the substrate) by further reducing the movement speed. Regarding the moving speed when aligning the carbon nanotubes, the moving speed/number of times of moving is preferably 0.3 μm/second or less, more preferably 0:2 μm/second or less, for example, 0.1 μm/second or less.

Since this moving speed depends on the speed at which the liquid interface moves on the substrate due to natural evaporation of the dispersion (for example, about 0.1 to 0.01 μm/sec at a humidity of 10 to 70 RH and room temperature (23° C.)), the moving speed may be adjusted according to the relationship with conditions such as environmental humidity. In this embodiment, from the viewpoint of orientation, it is further preferable that the movement speed is 0.3 μm/sec or less (the number of times of moving is 1).

When the moving speed is low, it is considered that the carbon nanotubes adhere to the substrate while depositing due to the coffee stain phenomenon on the liquid surface of the dispersion liquid. Depending on various conditions such as the moving speed, a bolometer film (carbon nanotube layer) may be formed as a single oriented layer on the substrate, or it is also possible to form a bolometer film comprising two or more layers; an unoriented layer formed on a substrate (network structure or poorly oriented layer) and an oriented layer formed thereon.

When the substrate is passed over the liquid surface of the carbon nanotube dispersion, for example, the substrate may be immersed in a liquid bath of the carbon nanotube dispersion, and then pulled up from the bath. Alternatively, the substrate may be pushed down into the bath of carbon nanotube dispersion.

Figure 6:
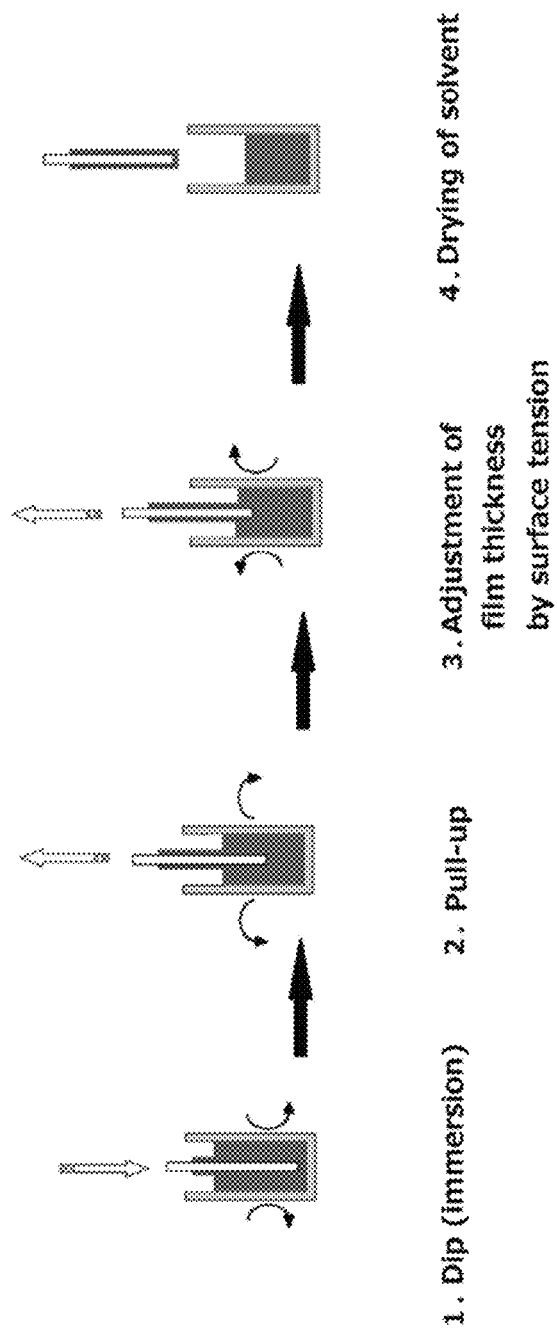
FIG. 6 is a schematic diagram showing one step in a method for manufacturing the bolometer according to one embodiment of the present invention.

The method of moving the substrate is not particularly limited, and it may be carried out manually, or the substrate may be placed on a jig that can be moved by pulling, pushing, or the like, and moved in one direction so that the substrate passes through the liquid surface of the carbon nanotube dispersion. A jig for moving includes, but is not limited to, a dip coater (FIG. 6), a constant speed moving machine, and the like.

The moving method is preferably a constant speed pull-up method. By moving at a constant speed, a bolometer film having a uniform thickness can be formed. Moreover, since the moving speed with respect to the film formation surface is relatively high in the portion in contact with the electrode wall (Region B), a bolometer film having a relatively low film thickness or density can be formed. In addition, the method of the present embodiment has the advantage that it is possible to prevent the bolometer film from becoming partially thick because the dispersion is less likely to pool at the connecting portion between the electrodes and the substrate.

The angle between the liquid surface and the substrate when the liquid surface of the carbon nanotube dispersion is passed is not particularly limited, but it is preferably approximately vertical to the liquid surface, for example, 30° or less, preferably 20° or less, for example 10° or less from the complete vertical, and vertical is more preferable.

The direction in which the electrodes formed on the substrate and the liquid surface of the carbon nanotube dispersion are passed may be moved so that the current flowing between the electrodes is vertical to the direction of movement of the substrate, or may be moved so that the current flowing direction is parallel to the direction of movement of the substrate. In either case, a bolometer film can be formed in which Region A on the top surface of the electrodes and Region C between the electrodes are connected by Region B in contact with the electrode wall. In addition, when forming an oriented film, a higher effect of lowering the resistance can be obtained by orienting the carbon nanotubes parallel to the direction in which the current flows, that is, by moving the substrate so that the direction of the current flows between the electrodes is vertical to the direction of movement of the substrate.

In this specification, the terms "parallel" and "vertical" that indicate orientation may include "approximately parallel" and "approximately vertical", respectively. The terms "approximately parallel" and "approximately vertical" may include aspects deviating from perfect "parallel" and "vertical" by 30° or less, preferably 20° or less, more preferably 10° or less.

As described above, after the carbon nanotubes in the dispersion are adhered onto the substrate and the electrodes by passing the substrate through the liquid surface of the carbon nanotube dispersion, if necessary, the surfactant and solvent in the dispersion can be removed by washing with water; ethanol, isopropyl alcohol, or the like, or by heat treatment. The temperature of the heat treatment can be appropriately set above the decomposition temperature of the surfactant, preferably 150 to 500° C., more preferably 160 to 500° C., for example, 180 to 400° C. If it is 180° C. or higher, it is more preferable because it is easy to suppress the residue of decomposition products of the surfactant. Also, if the temperature is 500° C. or lower, for example, 400° C. or lower, deterioration of the substrate and other constituent elements can be suppressed, which is preferable. In addition, it is possible to suppress the decomposition and size change of the carbon nanotubes, the detachment of the functional group, and the like.

4. Additional Step

As described above, after forming the bolometer film on the substrate with electrodes formed on its surface, if desired, a protective film or an infrared absorbing structure may be formed. For these steps, the steps used in the manufacturing process of the bolometer can be appropriately applied without limitation.

[Supplementary Notes]

The whole or part of the example embodiments disclosed above can be described as, but not limited to, the following supplementary notes.

(Supplementary Note 1)

A bolometer comprising two electrodes provided on a substrate and a bolometer film comprising carbon nanotubes, wherein the bolometer film is provided to connect an area of the top surfaces of the two electrodes, an area in contact with the electrode walls of the two electrodes, and an area between the two electrodes on the substrate; and the area density of the area of the bolometer film in contact with the electrode wall is less than or equal to the area density of the area between the electrodes on the substrate, or the film thickness of the area of the bolometer film in contact with the electrode wall is less than or equal to the film thickness of the area between the electrodes on the substrate.

(Supplementary Note 2)

The bolometer according to Supplementary note 1, wherein the bolometer film consists of one or more unoriented carbon nanotube layer.

(Supplementary Note 3)

The bolometer according to Supplementary note 2, wherein the bolometer film consists of one or more unoriented carbon nanotube layer, at least one of which is provided to connect the top surface of the two electrodes, the electrode wall of the two electrodes, and the area between the two electrodes on the substrate.

(Supplementary Note 4)

The bolometer according to Supplementary note 1, wherein the bolometer film comprises an oriented layer in which at least some of the carbon nanotubes are oriented.

(Supplementary Note 5)

The bolometer according to Supplementary note 4, wherein the oriented layer is provided to connect the top surface of the two electrodes, the electrode wall of the two electrodes, and the area between the two electrodes on the substrate.

(Supplementary Note 6)

The bolometer according to Supplementary note 4, wherein the bolometer film comprises the following two layers:
an oriented layer in which at least some of the carbon nanotubes are oriented, and
an unoriented layer in which carbon nanotubes are pointed in different directions; and
at least the oriented layer is provided to connect the top surface of the two electrodes, the electrode wall of the two electrodes, and the area between the two electrodes on the substrate.

(Supplementary Note 7)

The bolometer according to any one of Supplementary notes 1 to 6, wherein the area density of the area of the bolometer film in contact with the electrode wall is less than or equal to 90% of the area density of the area between the electrodes on the substrate, or the film thickness of the area of the bolometer film in contact with the electrode wall is less than or equal to 90% of the film thickness of the area between the electrodes on the substrate.

(Supplementary Note 8)

The bolometer according to any one of Supplementary notes 1 to 7, wherein the thickness of the electrode is 50 nm or more.

(Supplementary Note 9)

The bolometer according to any one of Supplementary notes 1 to 8, the bolometer film comprises semiconducting carbon nanotubes in an amount of 90% by mass or more of the total amount of carbon nanotubes.

(Supplementary Note 10)

A method for manufacturing a bolometer comprising two electrodes provided on a substrate and a bolometer film comprising carbon nanotubes, the method comprising;
forming the bolometer film to connect the top surface of the two electrodes, the electrode wall of the two electrodes, and the area between the two electrodes on the substrate, by passing the substrate with electrodes formed on its surface through the liquid surface of the carbon nanotube dispersion at a moving speed such that the moving speed/number of times is 5 µm/sec or less.

(Supplementary Note 11)

The method according to Supplementary note 10, wherein the moving speed is 5 µm/sec or less.

(Supplementary Note 12)

The method according to Supplementary note 10, wherein the bolometer film consisting of one or more unoriented carbon nanotube layer is formed.

(Supplementary Note 13)

The method according to Supplementary note 12, wherein the bolometer film consisting of two or more unoriented carbon nanotube layers, at least one of which is formed to connect the top surface of the two electrodes, the electrode wall of the two electrodes, and the area between the two electrodes on the substrate.

(Supplementary Note 14)

The method according to Supplementary note 10, the method comprising;
forming the bolometer film comprising an oriented layer in which at least some of the carbon nanotubes are oriented to connect the top surface of the two electrodes, the electrode wall of the two electrodes, and the area between the two electrodes on the substrate, by passing the substrate with electrodes formed on its surface through the liquid surface of the carbon nanotube dispersion at a moving speed such that the moving speed/number of times is 0.3 µm/sec or less.

(Supplementary Note 15)

The method according to any one of Supplementary notes 10 to 14, wherein the substrate with electrodes formed on its surface is moved using a constant speed pull-up method.

(Supplementary Note 16)

The method according to any one of Supplementary notes 10 to 15, the method comprising preparing the carbon nanotube dispersion comprising;

preparing the carbon nanotube dispersion comprising semiconducting carbon nanotubes by subjecting a dispersion of a mixture of metallic carbon nanotubes and semiconducting carbon nanotubes to a carrier-free electrophoresis.

(Supplementary Note 17)

The method according to any one of Supplementary notes 10 to 16, wherein the carbon nanotube dispersion comprises semiconducting carbon nanotubes in an amount of 90% by mass or more of the total amount of carbon nanotubes.

EXAMPLES

The present invention will be described further in detail by way of examples below, but the present invention should not be limited by the following examples.

Example 1

Step 1: Preparation of Carbon Nanotube Dispersion 100 mg of single-walled carbon nanotubes (Meijo Nanocarbon Co., Ltd., EC 1.0 (diameter: about 1.1 to 1.5 nm, average diameter 1.2 nm) were placed in a quartz boat and heat-treated using an electric furnace in a vacuum atmosphere. The heat treatment was performed at a temperature of 900° C. for 2 hours. The weight after heat treatment was reduced to 80 mg, indicating the removal of surface functional groups and impurities. After crushing the obtained single-walled carbon nanotube with tweezers, 12 mg of the single-walled carbon nanotube was immersed in 40 ml of a 1 wt % surfactant (polyoxyethylene (100) stearyl ether) aqueous solution, fully submerged, and subjected to ultrasonic dispersion processing (BRANSON ADVANCED-DIGITAL SONIFIER device, output 50 W) for 3 hours. This eliminated the carbon nanotube aggregates in the solution. By this operation, bundles, residual catalyst and so on were removed to obtain a carbon nanotube dispersion. In order to observe the length and diameter of the carbon nanotubes, this dispersion was applied onto a $SiO_2$ substrate, dried at 100° C., and observed with an atomic force microscope (AFM). As a result, it was found that 70% of the single-walled carbon nanotubes had a length in the range of 500 nm to 3 µm and an average length of about 800 nm.

The carbon nanotube dispersion obtained above was introduced into a separation device having a double-tube structure. About 15 ml of water, about 70 ml of the carbon nanotube dispersion, and about 10 ml of a 2 wt % surfactant aqueous solution were placed in the outer tube of the double tube, and about 20 ml of a 2 wt % surfactant aqueous solution was placed in the inner tube. The lower lid of the inner tube was then opened to create a three-layer structure with different concentrations of surfactant. By applying a voltage of 200 V with the lower side of the inner tube as the anode and the upper side of the outer tube as the cathode, the semiconducting carbon nanotubes moved to the anode side. On the other hand, the metallic carbon nanotubes moved to the cathode side. Semiconducting and metallic carbon nanotubes were cleanly separated about 80 hours after the start of separation. The separation process was performed at room temperature (approximately 25° C.). The semiconducting carbon nanotube dispersion that had moved to the anode side was recovered and analyzed by light absorption spectrum, and it was found that the metallic carbon nanotubes were removed. Also, from the Raman spectrum, 99 wt % of the carbon nanotubes in the carbon nanotube dispersion that moved to the anode side were semiconducting carbon nanotubes. Most of the single-walled carbon nanotubes had a diameter of about 1.2 nm (70% or more), and the average diameter was 1.2 nm.

A portion of the surfactant was removed from the carbon nanotube dispersion containing 99 wt % of the semiconducting carbon nanotubes (the carbon nanotube dispersion moved to the anode side) to adjust the concentration of the surfactant to 0.05 wt %. Thereafter, a carbon nanotube dispersion A (referred to as dispersion A) was prepared so that the concentration of carbon nanotubes in the dispersion was 0.01 wt %. This dispersion A was used for forming a carbon nanotube layer.

Step 2: Formation of Electrodes

After the Si substrate having $SiO_2$ formed on the surface was treated with oxygen plasma, a photoresist was applied and the electrodes were patterned so that the distance between the electrodes was 100 µm. The electrodes were formed by E-gun vapor deposition of 5 nm thick Ti and 100 nm thick Au for both the first electrode and the second electrode, and the resist was lifted off. This electrode-attached substrate was washed with acetone, isopropyl alcohol, and water in that order, and organic matters on the surface was removed by oxygen plasma treatment. The substrate was immersed in a 0.1% by volume APTES aqueous solution for 30 minutes, washed with water, and dried.

Step 3: Formation of Bolometer Film

The substrate having electrodes formed on the surface prepared in Step 2 was fixed to a dip coater so that the direction of movement was vertical to the direction in which the current flows through the electrode pair, and the electrode portion was immersed in the carbon nanotube dispersion A prepared in Step 1. After being immersed in the liquid bath, the operation of pulling up vertically at a speed of 4 µm/sec was performed once. After washing with water and isopropyl alcohol, it was dried and heated at 200° C. in the atmosphere to remove the nonionic surfactant and the like.

Examples 2 to 4

The bolometer films were formed in the same manner as in Example 1, except that the operation of pulling up the substrate from the carbon nanotube dispersion A was performed at the moving speed and number of times shown in Table 1. In Example 4, the operation of immersing the substrate in the liquid bath and pulling it up at a rate of 10 µm/sec was repeated five times.

The results are shown in Table 1.

Example 5

The bolometer film was formed in the same manner as in Example 1, except that the substrate was fixed to the dip coater so that the direction of movement was parallel to the direction in which the current flows through the electrode pair, and the operation of pulling up the substrate was performed once at 0.1 µm/sec in Step 3.

Example 6

The bolometer film was formed in the same manner as in Example 1, except that the substrate was fixed to the dip coater so that the direction of movement was vertical to the direction in which the current flowed through the electrode pair, and the operation of pulling up the substrate was performed once at 0.1 µm/sec in Step 3.

Example 7

The bolometer film was formed in the same manner as in Example 1, except that the substrate was fixed to the dip coater so that the direction of movement was vertical to the direction in which the current flowed through the electrode pair, and the operation of pulling up the substrate was performed once at 0.4 µm/sec in Step 3.

Comparative Example 1

Steps 1 and 2 were performed in the same manner as in Example 1. In step 3, about 100 µL of the CNT dispersion A was dropped onto the APTES-adhered substrate, spread over the entire surface of the substrate, and left to stand for 30 minutes. After washing with water and isopropyl alcohol, it was dried and heated at 200° C. in the atmosphere to remove the nonionic surfactant and the like.

When observing the substrate with an SEM, carbon nanotubes were attached in a random network. The average thickness of the carbon nanotube layer was about 10 nm as estimated from SEM observation.

Comparative Example 2

The bolometer film was formed in the same manner as in Comparative Example 1, except that about 100 µL of the CNT dispersion A was dropped onto the APTES-adhered substrate, spread over the entire surface of the substrate, and left to stand for 30 minutes, the liquid was discarded and dried, and then about 100 µL of the CNT dispersion A was dropped onto the substrate again, the dispersion was spread over the entire surface of the substrate, allowed to stand for 30 minutes, and then washed with water and isopropyl alcohol in Step 3.

SEM observation of the substrate revealed that carbon nanotubes were attached in a random network. The average thickness of the carbon nanotube layer was about 30 nm as estimated from SEM observation.

Comparative Examples 3 to 5

A bolometer films were formed in the same manner as in Example 1; except that the operation of pulling up the substrate from the carbon nanotube dispersion A was performed at the moving speed and number of times shown in Table 1.
Results Table 1 shows the connection of the carbon nanotube, layers, the film thickness of the carbon nanotube layers (between the electrodes), the area density ratio of the carbon nanotube layers, and the resistance at 3V for the bolometers manufactured above.

The area density ratio of the carbon nanotube layer was calculated by the following method.

(1) Calculation of Carbon Nanotube Occupancy

For each of the areas of the formed carbon nanotube layer on the substrate and the areas in contact with the electrode walls, SEM images of 10 random points (field of view 100 nm×1 µm) were analyzed using image analysis software "WinROOF" to identify an area where carbon nanotubes exist and an area of gap where carbon nanotubes do not exist. The carbon nanotube occupancy was calculated as:

[Carbon nanotube occupancy=Area of portion where carbon nanotube exists/(Area of portion where carbon nanotube exists+Area of gap where carbon nanotube does not exist)]

(2) Calculation of Area Density Ratio

The area density ratio was calculated as:

[Carbon nanotube occupancy in area in contact with electrode wall/Carbon nanotube occupancy in area on substrate (between electrodes)]

Evaluation of Examples 1 to 4 and Comparative Examples 1 to 2

As shown in Table 1, in the bolometers of Examples 1 to 4, as compared with the bolometers of Comparative Examples 1 and 2, a remarkable effect of lowering the resistance was observed.

Figure 7:
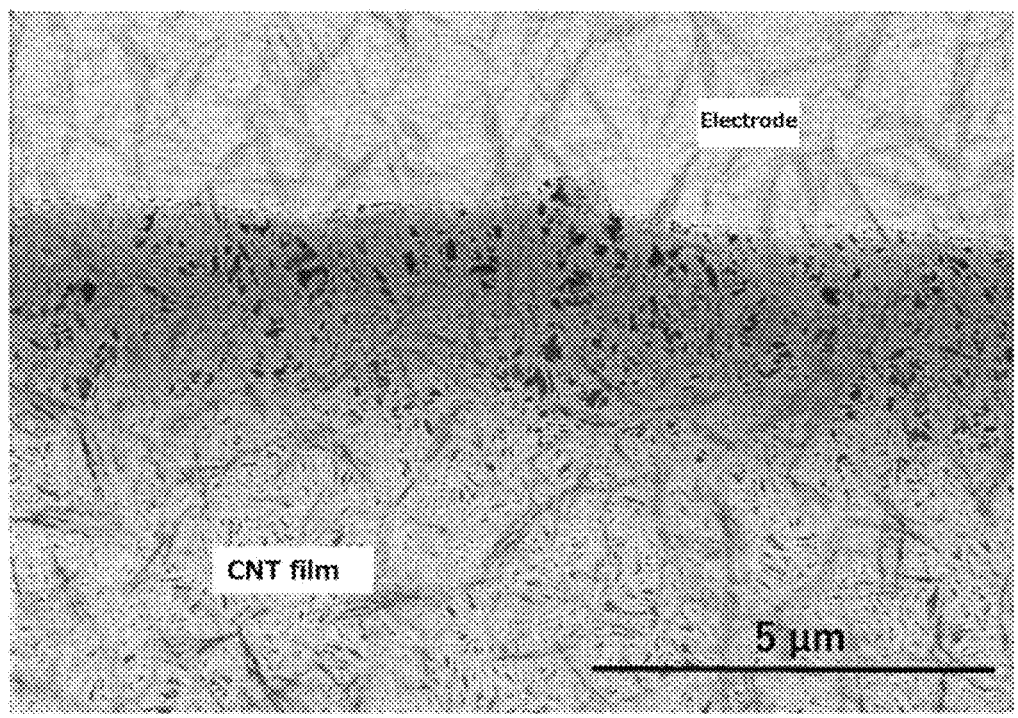
FIG. 7 is a SEM image of the bolometer film in Examples.

In the bolometer films of Examples 1 to 4, it was confirmed that the carbon nanotube layer on the substrate (between the electrodes) and the carbon nanotube layer on the top surface of the electrodes were connected by the carbon nanotube layer in contact with the electrode wall (FIG. 7). In addition, all the area density ratios were less than 100%, and it was confirmed that the density of the carbon nanotube layer on the electrode wall was lower than that on the substrate (between the electrodes).

On the other hand, in the bolometer films of Comparative Examples 1 and 2, the carbon nanotube layer on the substrate (between the electrodes) and the carbon nanotube layer on the top surface of the electrodes were not connected.

Comparing Comparative Example 1 and Comparative Example 2, Comparative Example 2 had a thicker carbon nanotube layer and a larger contact area with the electrode, but the resistance was higher. This result suggests that a moderately thin carbon nanotube layer as in Comparative Example 1 can completely remove the surfactant, resulting in a low resistance. From these results, in Examples 1 to 4, the carbon nanotubes on the substrate are connected to the carbon nanotubes on the top surface of the electrodes, and the bolometer film does not have a thick portion, so it is considered that Examples 1 to 4 achieved an excellent effect of lowering the resistance compared to Comparative Examples 1 and 2.

Evaluation of Examples 1 to 4 and Comparative Examples 3 to 5

In Comparative Examples 3 to 5, the bolometer films were formed in the same pull-up method as in Examples 1 to 4, but since the moving speed was high, the carbon nanotube layer on the substrate (between the electrodes) was not connected to the carbon nanotube layer on the top surface of the electrodes in the bolometers of Comparative Examples 3 to 5. Therefore, the bolometers of Comparative Examples 3 to 5 had higher resistance than those of Examples 1 to 4.

Evaluation of Examples 5 to 7

Figure 8:
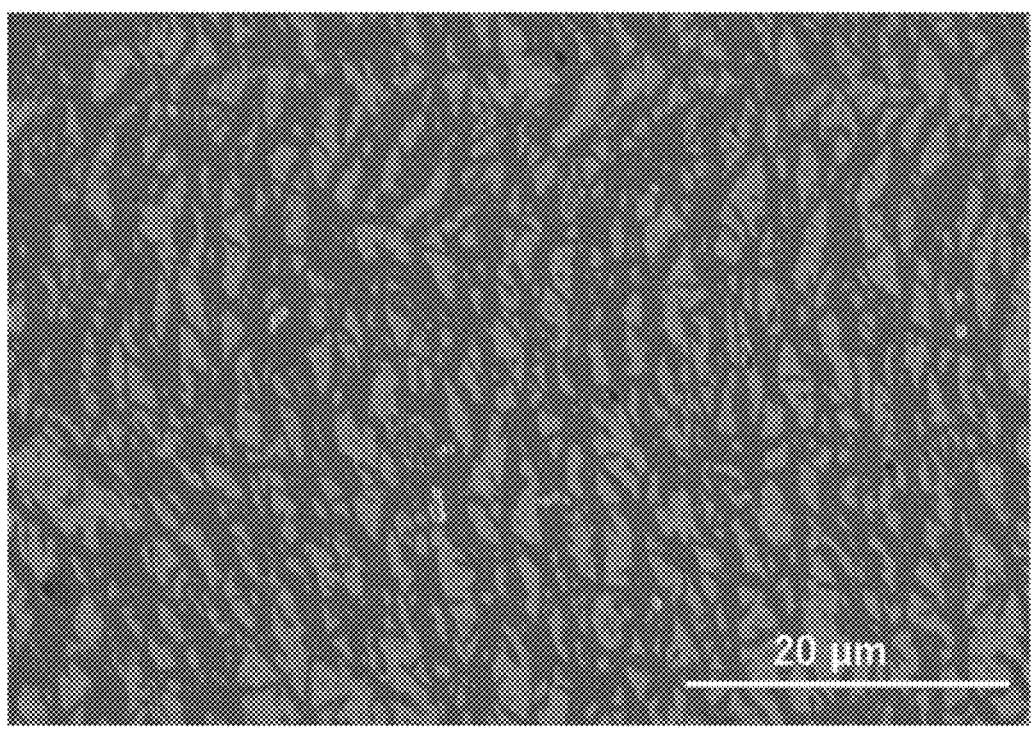
FIG. 8 is a SEM image of the bolometer film in Examples.

In Examples 5 and 6, a bolometer film in which the carbon nanotubes were oriented in a direction parallel to the liquid surface of the carbon nanotube dispersion could be produced by lowering the movement speed of the substrate (FIG. 8). The SEM image is subjected to two-dimensional Fourier transform processing (FIG. 9), and the integrated value f of the amplitude from the frequency −1 µm$^{-1}$ to +1 µm$^{-1}$ in one direction from the center is calculated. Assuming that the integrated value in the direction x in which the integrated value f is the maximum is $f_x$, and the integrated value in the direction y vertical to the direction x is $f_y$, when $f_x/f_y$ was calculated, it was 1.8 in Example 5 and 2.0 in Example 6.

In Example 6, in which the carbon nanotubes were oriented parallel to the electrodes (vertical to the direction of current flow), a resistance reduction effect equivalent to that of the bolometers of Examples 1 to 4 was obtained. Moreover, in Example 6, in which the carbon nanotubes were oriented vertical to the electrodes (parallel to the direction of current flow), a further effect of lowering the resistance was achieved as compared with Example 5.

Figure 9:
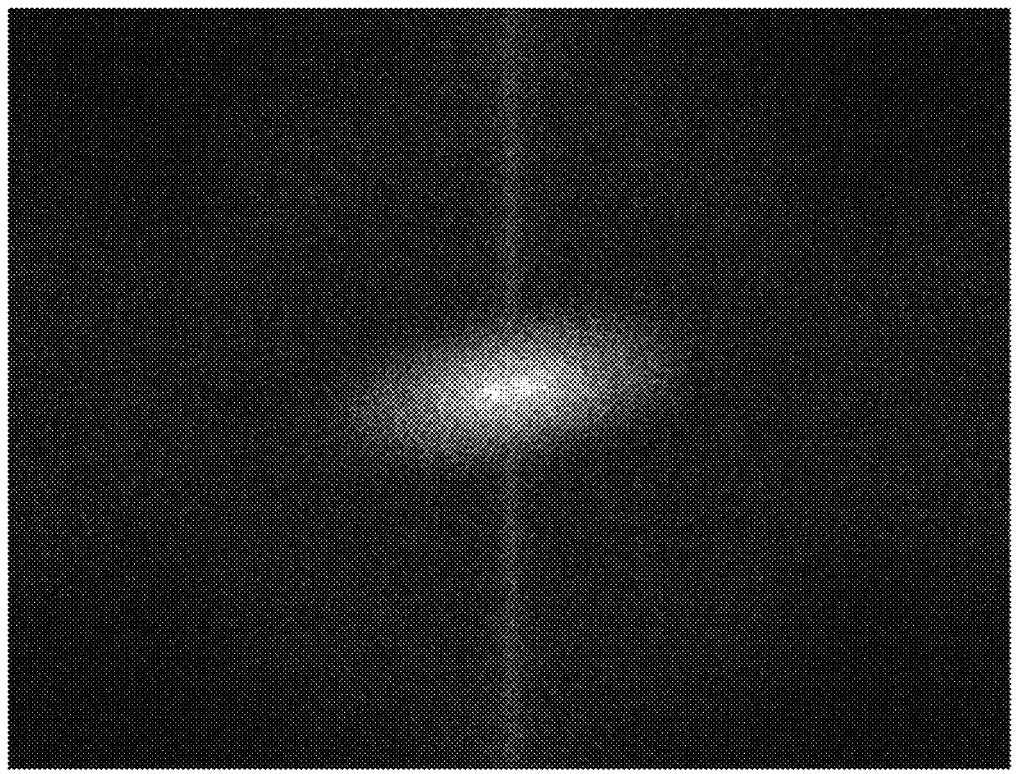
FIG. 9 is an image obtained by two-dimensional fast Fourier transform processing of the SEM image of the bolometer film in Examples.
Figure 10:
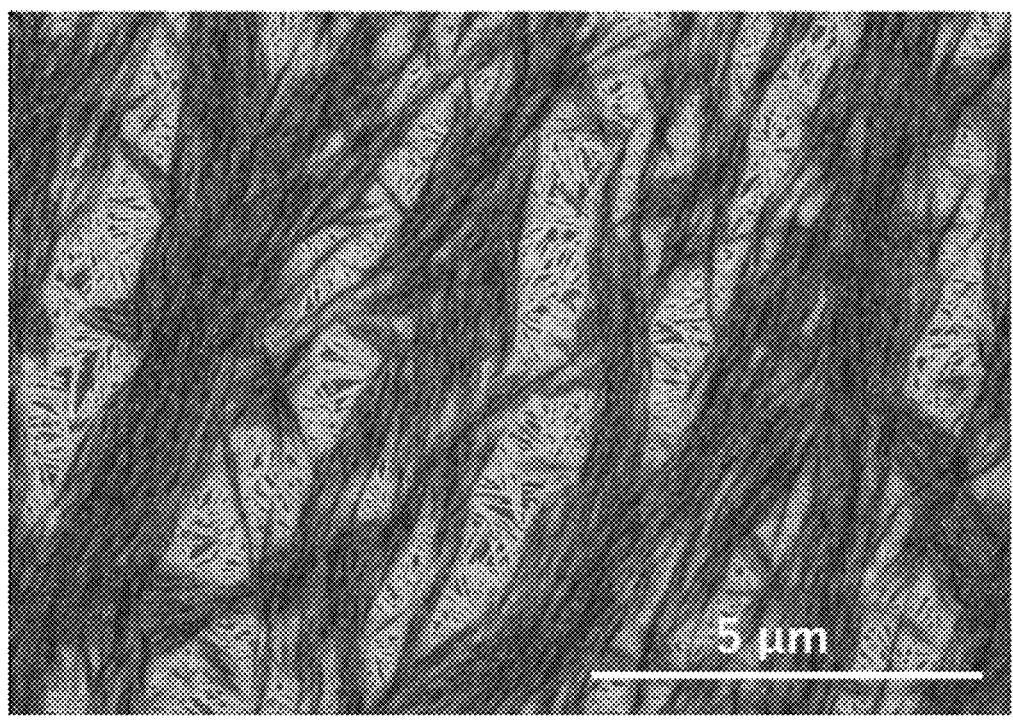
FIG. 10 is a SEM image of the bolometer film in Examples.

In addition, all the oriented carbon nanotube films obtained in Examples 5 and 6 had a two-layer structure in which the upper layer was an oriented layer and the lower layer near the substrate was a network-like non-oriented layer, as shown in FIG. 10. It was found that the carbon nanotubes on the substrate (between the electrodes), the carbon nanotubes on the top surface of the electrodes, and the carbon nanotubes in contact with the electrode walls were connected in the upper layer (FIGS. 8, 9 and 10 are the results of Example 6).

It was possible to make a carbon nanotube film having a two-layer structure in which both layers were non-oriented in Example 7, by making the moving speed of the substrate slightly higher than that in Examples 5 and 6. It was confirmed that the carbon nanotube layer on the substrate (between the electrodes) and the carbon nanotube layer on the top surface of the electrodes are connected by the carbon nanotube layer in contact with the electrode wall in the upper layer of the unoriented film of this two-layer structure (FIG. 11). The unoriented film of Example 7 also provided the same resistance reduction effect as the bolometers of Examples 1 to 4.

Example 8

Step 1: Preparation of Carbon Nanotube Dispersion

Carbon nanotube dispersion A (described as dispersion A) was prepared in the same manner as in Example 1 so that the concentration of carbon nanotubes in the dispersion liquid was 0.01 wt %. This dispersion liquid A was used for forming a carbon nanotube layer.

Step 2: Formation of Electrodes

After the Si substrate having $SiO_2$ formed on the surface was treated with oxygen plasma, a photoresist was applied and the electrodes were patterned so that the distance between the electrodes was 100 µm. The electrodes were formed by E-gun vapor deposition of 5 nm thick Ti and 100 nm thick Au for both the first electrode and the second electrode, and the resist was lifted off.

This electrode-attached substrate was washed with acetone, isopropyl alcohol, and water in that order, and the organic matter on the surface was removed by oxygen plasma treatment.

Step 3: Formation of Bolometer Film

The substrate having electrodes formed on the surface prepared in Step 2 was fixed to a dip coater so that the direction of movement was vertical to the direction in which the current flows through the electrode pair, and the electrode portion was immersed in the carbon nanotube dispersion A prepared in Step 1. After being immersed in the liquid bath, the operation of pulling up vertically at a speed of 0.1 µm/sec was performed once. After washing with water and isopropyl alcohol, it was dried and heated at 200° C. in the atmosphere to remove the nonionic surfactant and the like.

Comparative Example 6

Steps 1 and 2 were performed in the same manner as in Example 8. In step 3, about 100 µL of the CNT dispersion A was dropped onto the substrate, spread over the entire surface of the substrate, and left to stand for 30 minutes. After washing with water and isopropyl alcohol, it was dried

TABLE 1

| | Speed (µm/second) × number of times | Connection of CNTs on electrodes-CNTs between electrodes | Resistance value @3 V | Area density ratio % (electrode wall/between electrodes) | Bolometer film thickness (between electrodes) (nm) |
|---|---|---|---|---|---|
| Example 1 | 4 × 1 | ○ | $3.4 \times 10^7$ | 70% | 10 |
| Example 2 | 2 × 1 | ○ | $2.6 \times 10^7$ | 80% | 10 |
| Example 3 | 1 × 1 | ○ | $5.1 \times 10^7$ | 84% | 10 |
| Example 4 | 10 × 5 | Partially ○ | $6.4 \times 10^7$ | 35% | 10 |
| Example 5 | 0.1 × 1 | ○ (Oriented vertical to the direction of curent flow) | $3.2 \times 10^7$ | 43% | 35 |
| Example 6 | 0.1 × 1 | ○ (Oriented parallel to the direction of the current) | $2.8 \times 10^8$ | 85% | 15 |
| Example 7 | 0.4 × 1 | ○ (No orientation) | $1.6 \times 10^7$ | 50% | 15 |
| Comparative Example 1 | — | x | $3.0 \times 10^8$ | — | 10 |
| Comparative Example 2 | — | x | $2.0 \times 10^{10}$ | — | 30 |
| Comparative Example 3 | 100 × 20 | x | $1.1 \times 10^9$ | — | 10 |
| Comparative Example 4 | 10 × 1 | x | $3.1 \times 10^9$ | — | 10 |
| Comparative Example 5 | 6 × 1 | x | $4.1 \times 10^7$ | — | 10 | and heated at 200° C. in the atmosphere to remove the nonionic surfactant and the like.

Results

Table 2 shows the connection of the carbon nanotube layers, the film thickness of the carbon nanotube layers (between the electrodes), the area density ratio of the carbon nanotube layers, and the resistance at 3V for the bolometers manufactured above.

TABLE 2

| | Speed (μm/ second) × number of times | Connection of CNTs on electrodes-CNTs between electrodes | Resistance valve @3 V | Area density ratio % (electrode wall/ between electrodes) | Bolometer film thickness (between electrodes) (nm) |
|---|---|---|---|---|---|
| Example 8 | 0.1 × 1 | ○ (Oriented parallel to the direction of the current) | $2.6 \times 10^6$ | 50% | 15 |
| Comparative Example 6 | — | × | $5.5 \times 10^{12}$ | — | 1 |

Evaluation of Example 8 and Comparative Example 6

As shown in Table 2, in the bolometer of Example 8, as compared with the bolometers of Comparative Example 6, a remarkable effect of lowering the resistance was observed.

Figure 12:
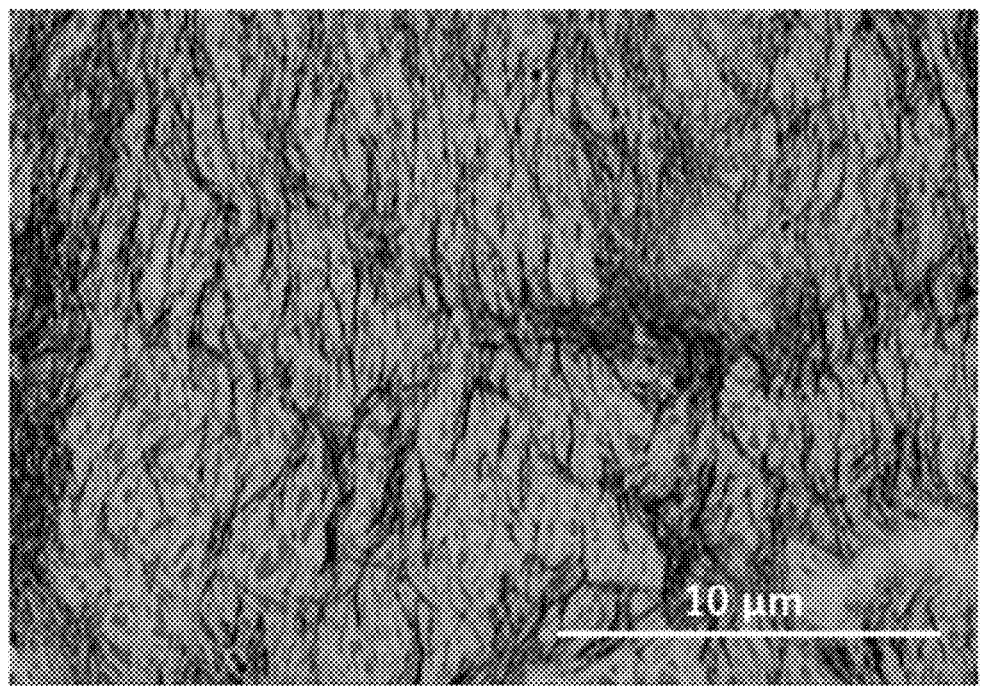
FIG. 12 is a SEM image of the bolometer film in Examples.

In the bolometer film of Example 8, it was confirmed that the carbon nanotube layer on the substrate (between the electrodes) and the carbon nanotube layer on the top surface of the electrodes were connected by the carbon nanotube layer in contact with the electrode wall. The carbon nanotubes were oriented parallel to the current direction in both the lower layer and the upper layer near the substrate in Example 8 (FIG. 12) by not forming an intermediate layer such as an APTES layer and by slowing down the moving speed of the substrate.

On the other hand, in the bolometer films of Comparative Example 6, only a few random network carbon nanotubes adhere to the substrate, and the carbon nanotube layer on the substrate (between the electrodes) and the carbon nanotube layer on the top surface of the electrodes were not connected.

From these results, in Example 8, the carbon nanotube layer is an oriented layer, and the carbon nanotubes on the substrate were connected to the carbon nanotubes of the top surface of the electrodes, so it is considered that Example 8 achieved an excellent effect of lowering the resistance compared to Comparative Examples 6.

EXPLANATION OF REFERENCE

1 Substrate
2 First electrode
3 Bolometer film
4 Second electrode
5 CNT film on electrode
6 CNT film between electrodes
7 Electrode

The invention claimed is:

1. A bolometer comprising two electrodes provided on a substrate and a bolometer film comprising carbon nanotubes, wherein
    the bolometer film is provided to connect an area of the top surfaces of the two electrodes, an area in contact with the electrode walls of the two electrodes, and an area between the two electrodes on the substrate; and
    the area density of the area of the bolometer film in contact with the electrode wall is less than or equal to the area density of the area between the electrodes on the substrate, or the film thickness of the area of the bolometer film in contact with the electrode wall is less than or equal to the film thickness of the area between the electrodes on the substrate.

2. The bolometer according to claim 1, wherein the bolometer film consists of one or more unoriented carbon nanotube layer.

3. The bolometer according to claim 1, wherein the bolometer film comprises an oriented layer in which at least some of the carbon nanotubes are oriented.

4. The bolometer according to claim 3, wherein the oriented layer is provided to connect the top surface of the two electrodes, the electrode wall of the two electrodes, and the area between the two electrodes on the substrate.

5. The bolometer according to claim 3, wherein the bolometer film comprises the following two layers:
    the oriented layer in which at least some of the carbon nanotubes are oriented, and
    an unoriented layer in which carbon nanotubes are pointed in different directions; and
    at least the oriented layer is provided to connect the top surface of the two electrodes, the electrode wall of the two electrodes, and the area between the two electrodes on the substrate.

6. The bolometer according to claim 1, wherein the area density of the area of the bolometer film in contact with the electrode wall is less than or equal to 90% of the area density of the area between the electrodes on the substrate, or the film thickness of the area of the bolometer film in contact with the electrode wall is less than or equal to 90% of the film thickness of the area between the electrodes on the substrate.

7. A method for manufacturing a bolometer comprising two electrodes provided on a substrate and a bolometer film comprising carbon nanotubes, the method comprising;
    forming the bolometer film to connect the top surface of the two electrodes, the electrode wall of the two electrodes, and the area between the two electrodes on the substrate, by passing the substrate with electrodes formed on its surface through the liquid surface of the carbon nanotube dispersion at a moving speed such that the moving speed/number of times is 5 μm/sec or less.

8. The method according to claim 7, the method comprising;
    forming the bolometer film comprising an oriented layer in which at least some of the carbon nanotubes are oriented to connect the top surface of the two electrodes, the electrode wall of the two electrodes, and the area between the two electrodes on the substrate, by passing the substrate with electrodes formed on its surface through the liquid surface of the carbon nanotube dispersion at a moving speed such that the moving speed/number of times is 0.3 μm/sec or less.

9. The method according to claim 7, wherein the substrate with electrodes formed on its surface is moved using a constant speed pull-up method.

10. The method according to claim 7, the method comprising preparing the carbon nanotube dispersion comprising;
preparing the carbon nanotube dispersion comprising semiconducting carbon nanotubes by subjecting a dispersion of a mixture of metallic carbon nanotubes and semiconducting carbon nanotubes to a carrier-free electrophoresis.

* * * * *